United States Patent
Nakamura

[11] 3,981,563
[45] Sept. 21, 1976

[54] RETROFOCUS WIDE ANGLE LENS SYSTEM

[75] Inventor: Akiyoshi Nakamura, Sakai, Japan

[73] Assignee: Minolta Camera Kabushiki Kaisha, Osaka, Japan

[22] Filed: May 8, 1975

[21] Appl. No.: 575,493

[30] Foreign Application Priority Data
May 11, 1974 Japan.................................. 49-52563

[52] U.S. Cl. ............................................. 350/214
[51] Int. Cl.² ........................................... G01B 9/64
[58] Field of Search .................................. 350/214

[56] References Cited
UNITED STATES PATENTS

| | | | |
|---|---|---|---|
| 3,856,386 | 12/1974 | Fujioka | 350/214 |
| 3,877,795 | 4/1975 | Yamashita | 350/214 |
| 3,884,556 | 5/1975 | Nakagawa | 350/214 |

*Primary Examiner*—John K. Corbin
*Assistant Examiner*—Conrad Clark
*Attorney, Agent, or Firm*—Jackson & Jones

[57] ABSTRACT

A retrofocus wide angle lens system provides an increased field angle with a large aperture ratio. Besides the specific arrangement of the individual lens components in the various embodiments of the present invention, the retrofocus wide angle lens design further satisfies the following conditions:

$$0 > \frac{r_8 + r_7}{r_8 - r_7} > -1.9; \quad (a)$$

$$-0.05 < \frac{r_{14}}{r_{13}} < 0.6; \text{ and} \quad (b)$$

$$\frac{0.1}{f} < \frac{N_I - N_{II}}{R} < \frac{0.3}{f} \quad (c)$$

wherein $r$ is the radii of curvatures for the successive lens surfaces from the object to image side of the lens system; $N_I$ and $N_{II}$ represent the refractive indices of lenses forming a cemented doublet on the image side of the diaphragm; $R$ represents the common radius of curvature of an intermediate surface of the doublet and $f$ represents the overall focal length of the lens system.

19 Claims, 44 Drawing Figures

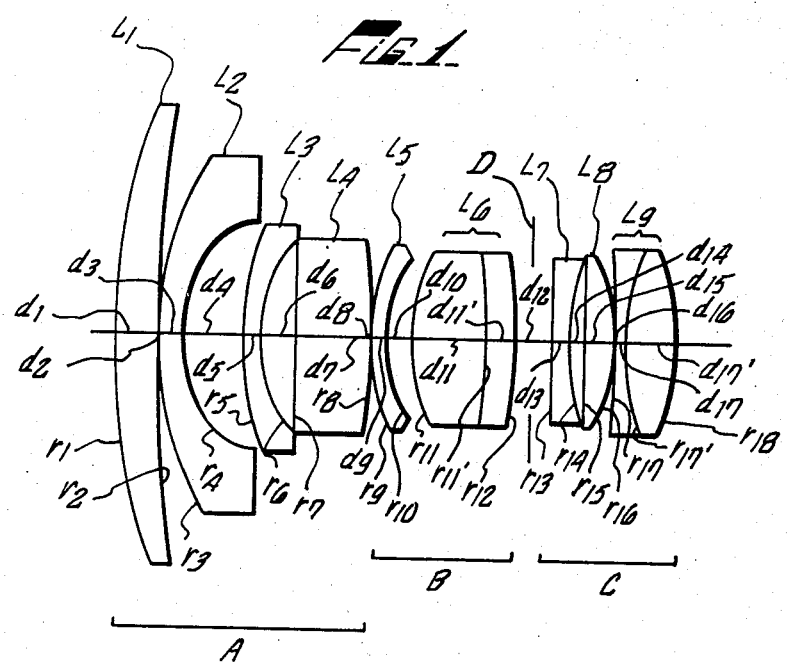
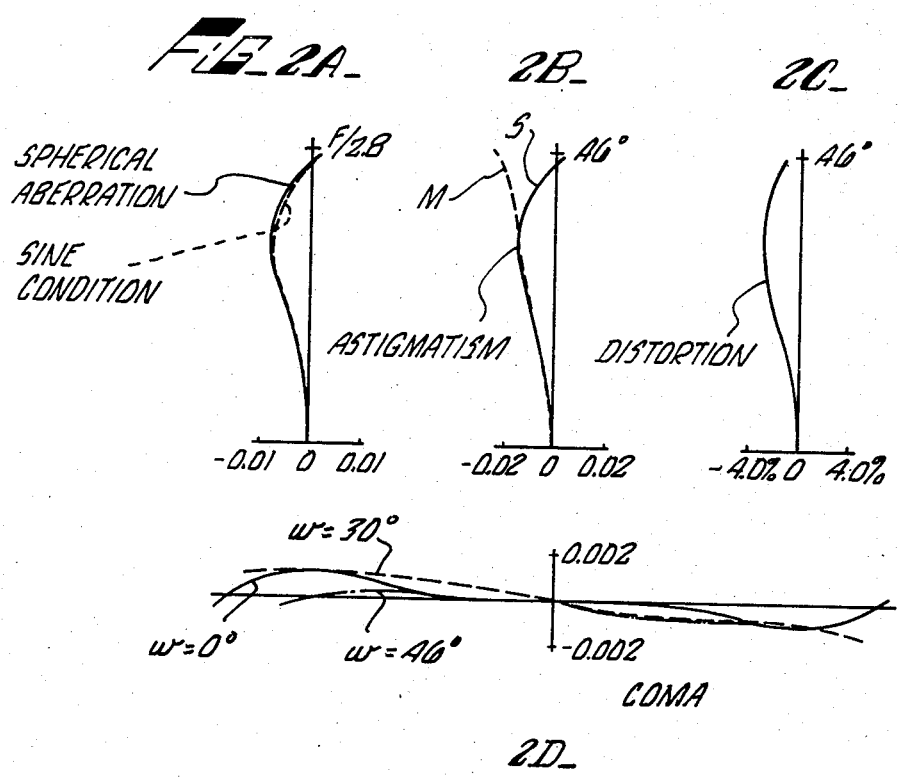

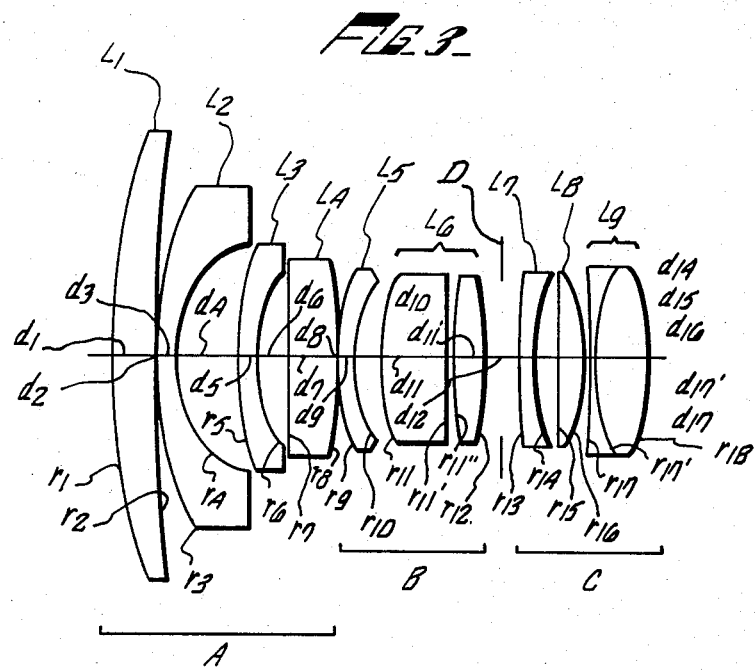
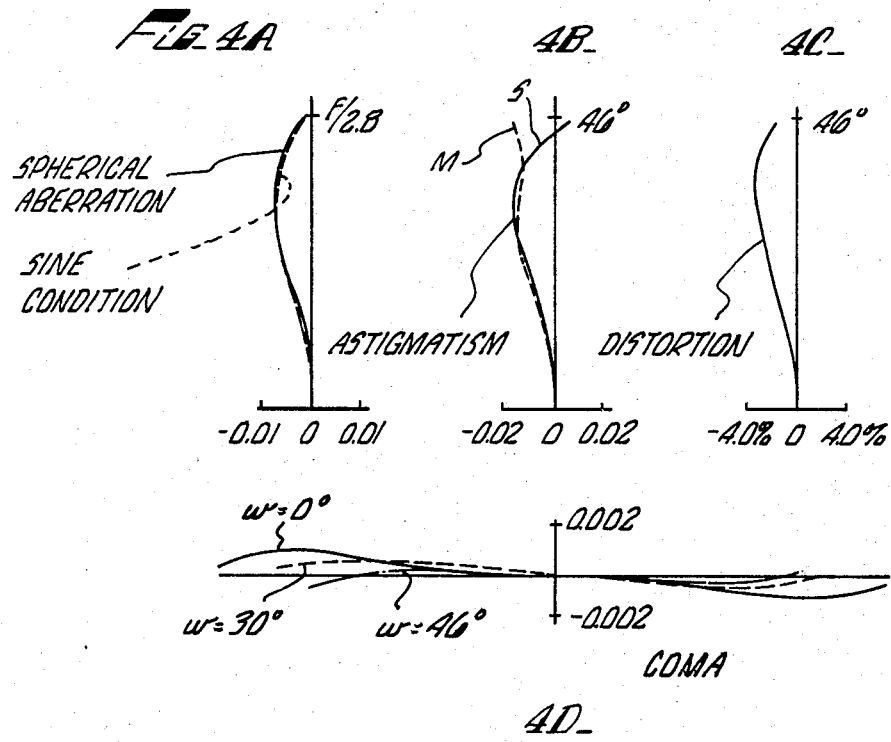

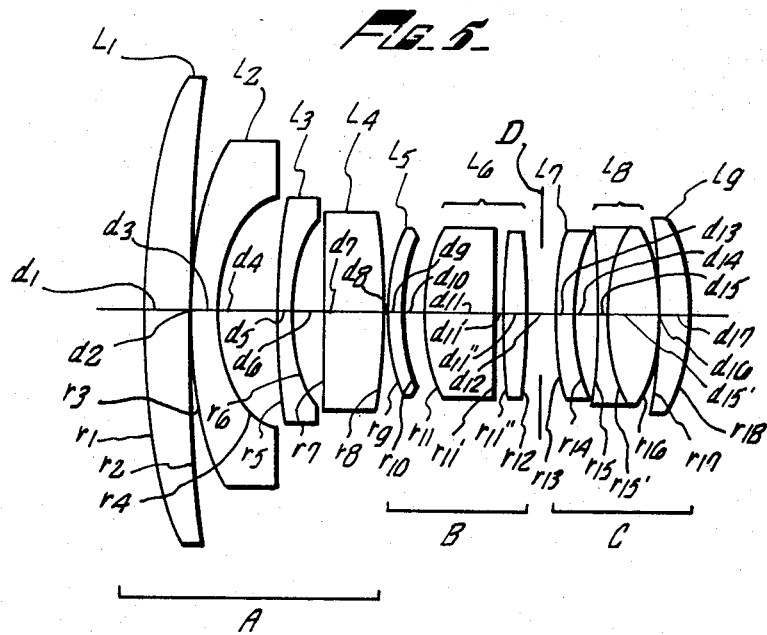
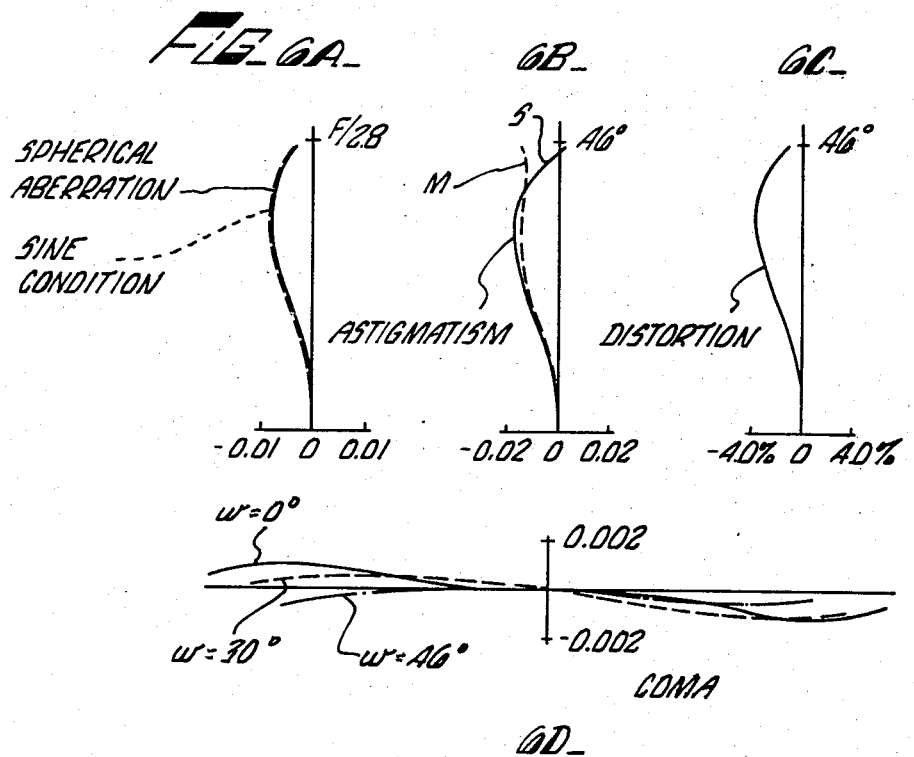

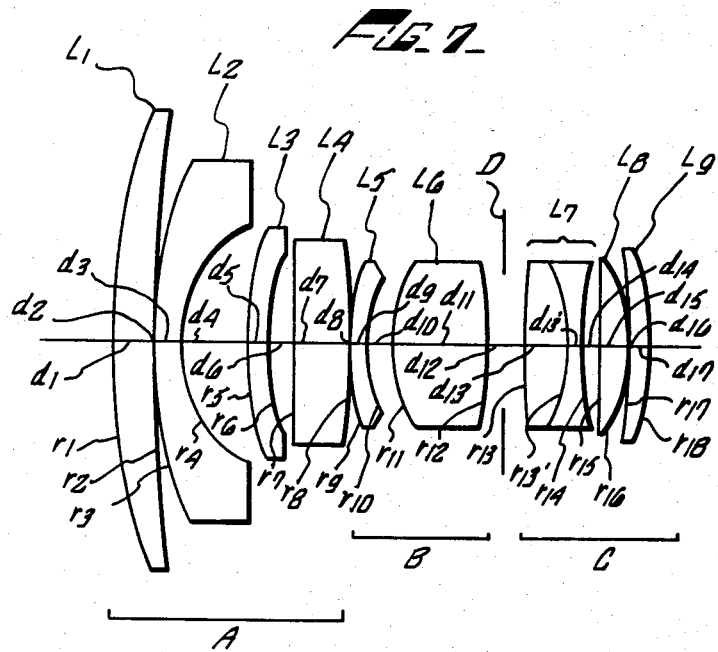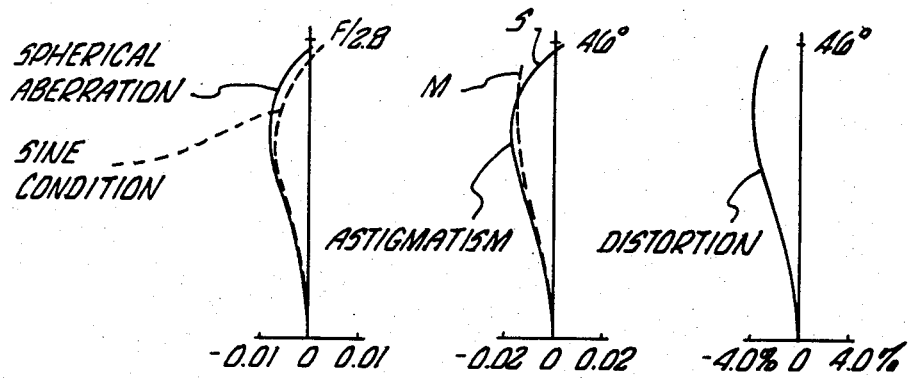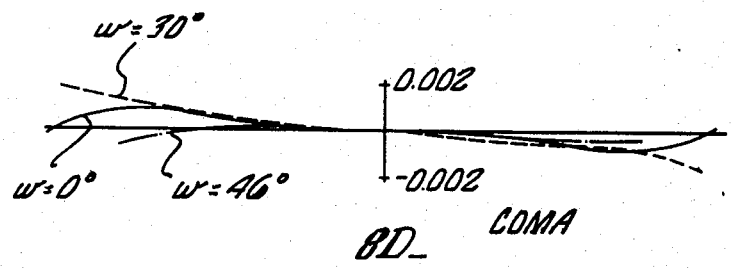

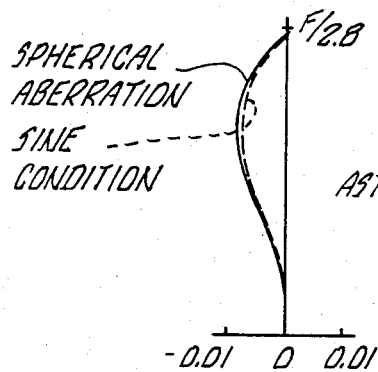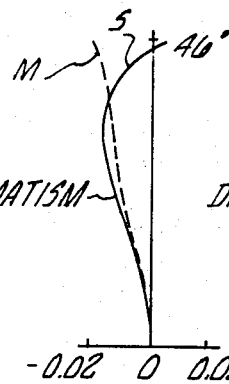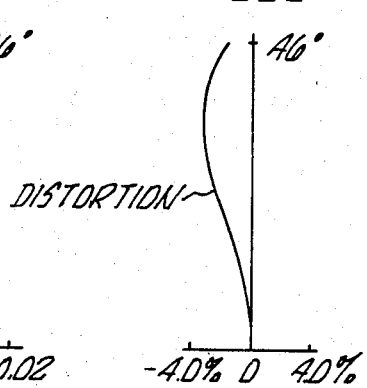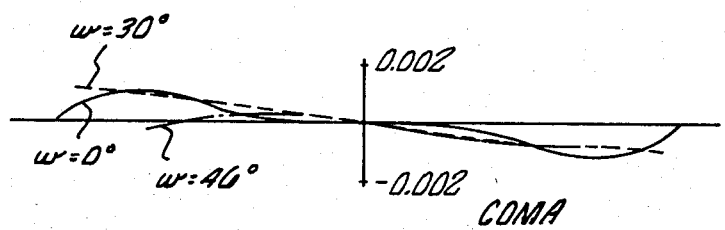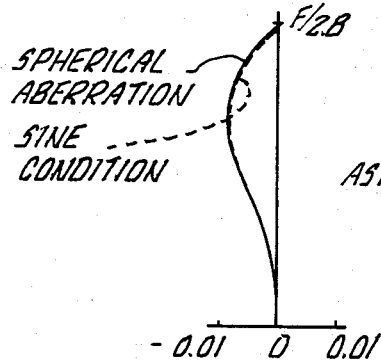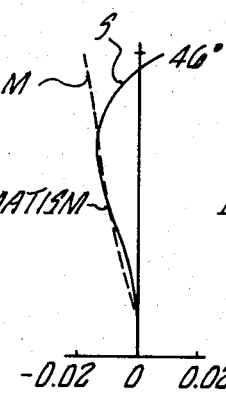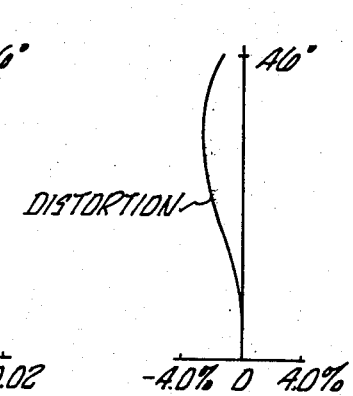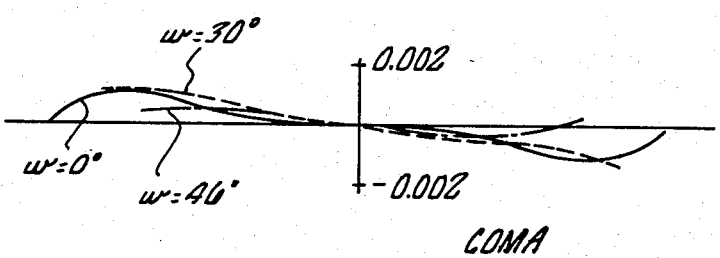

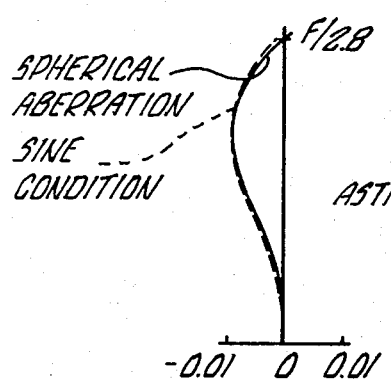
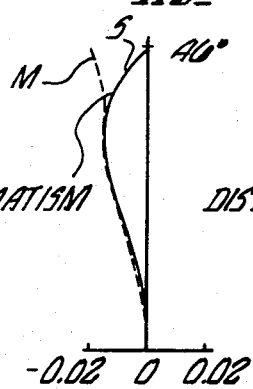
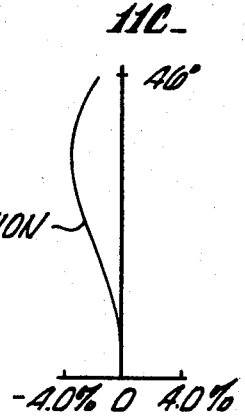
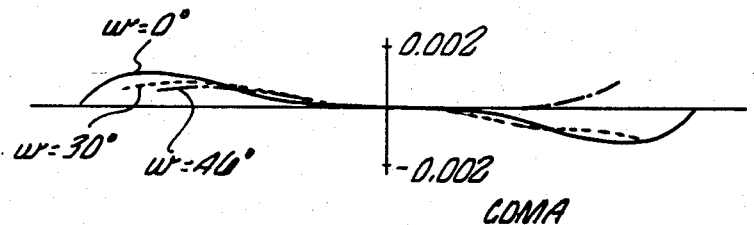
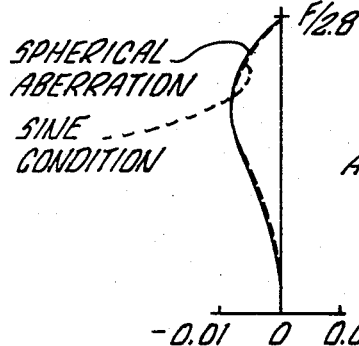
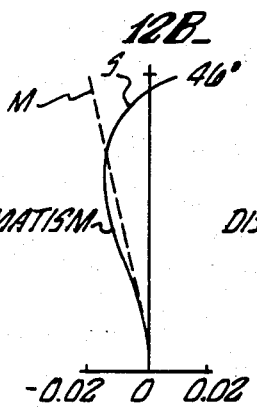
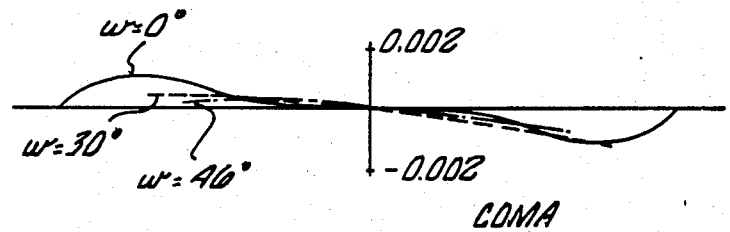

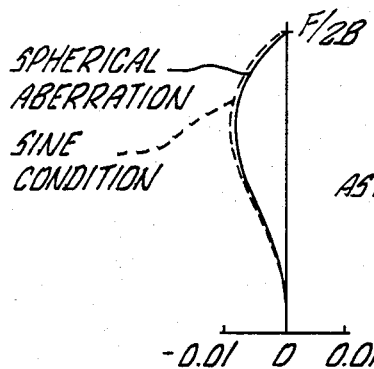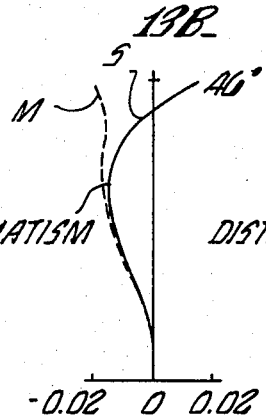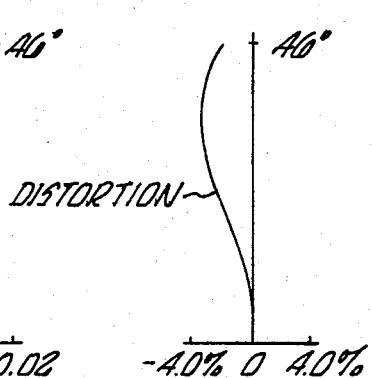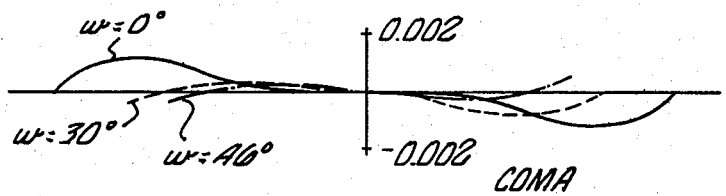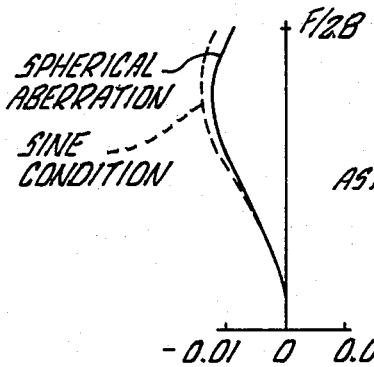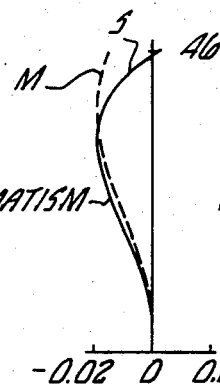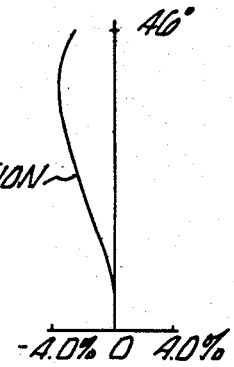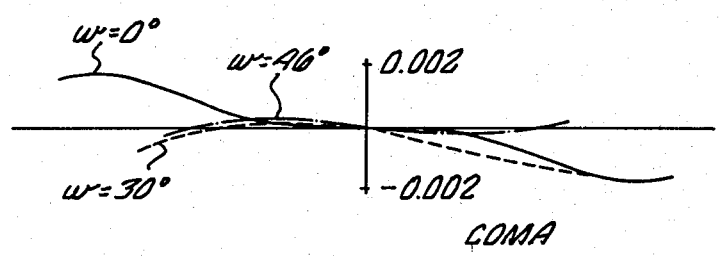

RETROFOCUS WIDE ANGLE LENS SYSTEM

BACKGROUND OF THE INVENTION

1. Field of the Invention

The present invention relates generally to the wide angle lens systems and more particularly to a retrofocus wide angle lens system having low distortion and highly corrected aberrations that is useful as a camera objective lens.

2. Description of the Prior Art

A demand has existed in the optical field for wide angle lens systems having a relatively high aperture ratio. In the field of photography, there is presently a demand to provide a wide angle photographic objective lens system that is capable of providing images having relatively low distortion. In compact single lens reflex cameras incorporating a reflecting mirror or prism, it is necessary that the back focal length be greater than the entire focal length of the lens system. It is known in the prior art to utilize retrofocus wide angle lens systems with single lens reflex cameras, for example, in the Shimizu U.S. Pat. No. 3,874,770. Problems however, have frequently occurred in correcting the aberration over a wide angle and in maintaining sufficient brightness for the desired photographic purposes.

Further examples of wide angle photographic lens systems can be found in the Mori U.S. Pat. No. 3,549,241 and U.S. Pat. No. 3,663,095, Shimizu U.S. Pat. No. 3,622,227 and U.S. Pat. No. 3,736,049, Takahashi et al. U.S. Pat. No. 3,870,402, Yamashita et al. U.S. Pat. No. 3,870,400 and U.S. Pat. No. 3,877,795 and Glatzel U.S. Pat. No. 3,864,026.

Recently, a Japanese patent application no. 44,326/1972 filed on May 4, 1972 in Japan was open to public inspection as No. 5,621/1974 on Jan. 18, 1974. The disclosed lens system was a retrofocus type wide angle lens system which included a first positive meniscus lens with its convex surface towards the object side; a second negative meniscus lens with its convex surface towards the object side; a third negative meniscus lens with its convex surface towards the object side and a fourth positive lens having an object surface radius of curvature of smaller absolute value than the image surface radius of curvature.

SUMMARY OF THE INVENTION

An object of the present invention is to provide a retrofocus type wide angle lens system having an extremely wide field angle while maintaining a compact size with a sufficiently long back focal length and a large aperture ratio.

Another object of the present invention is to provide a retrofocus type wide angle lens system having a minimum of aberrations.

A further object of the present invention is to provide a lens system having a first group of four lenses providing a wide field angle and particularly suited to permit compensation of aberrations.

A still further object of the present invention is to provide a third lens group positioned rearward of the diaphragm that is capable of compensating the aberrations generated by the preceding lens groups in the lens system.

The present invention can be further defined by the following conditions:

$$0 > \frac{r_4 + r_7}{r_4 - r_7} > -1.9 \; ; \tag{a}$$

$$-0.05 < \frac{r_{14}}{r_{13}} < 0.6 \; ; \tag{b}$$

and $$\frac{0.1}{f} < \frac{N_I - N_{II}}{R} < \frac{0.3}{f} \tag{c}$$

wherein $r$ represents the radii of curvature of the lens surface from the object to the image side; $N_I$ represents the refractive index of one of the lenses in the third lens groups; $N_{II}$ represents a refractive index of another one of the lenses in the third lens group; R represents the radius of curvature of the curvature of the intermediate or common surface of a pair of lenses forming a cemented doublet; and $f$ represents the overall focal length of the system.

The first lens group in the lens system includes a positive meniscus lens; a first and second negative meniscus lens; and a positive lens having an object surface whose radius of curvature has an absolute value greater than that of the image surface radius of curvature.

The third lens group includes a negative lens having a surface on the object side with a radius of curvature whose absolute value is greater than that of the image surface plus a first and second positive lens. At least one of the lenses in the third group comprises a cemented doublet.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a cross sectional view of one embodiment of the present invention;

FIGS. 2A, 2B, 2C and 2D disclose respectively the spherical aberration, astigmatism, distortion and coma for the lens system of FIG. 1;

FIG. 3 is a cross sectional view of another embodiment of the present invention;

FIGS. 4A, 4B, 4C and 4D respectively show the spherical aberration, astigmatism, distortion and coma of the lens system of FIG. 3;

FIG. 5 discloses a cross sectional embodiment of yet another embodiment of the present invention;

FIGS. 6A, 6B, 6C and 6D show respectively the spherical aberration, astigmatism, distortion and coma of the lens system of FIG. 5;

FIG. 7 shows another embodiment of the present invention;

FIGS. 8A, 8B, 8C and 8D disclose respectively the spherical aberration, astigmatism, distortion and coma of the lens system of FIG. 7; and the respective FIGS. 9 to 14 disclose respectively the spherical aberration, astigmatism, distortion and coma for additional embodiments of the present invention.

BRIEF DESCRIPTION OF THE PREFERRED EMBODIMENT

The following description is provided to enable any person skilled in the optical art to make and use the invention and sets forth the best mode contemplated by the inventor of carrying out his invention. Various modifications however, will remain readily apparent to those skilled in the art, since the generic principles of the present invention have been defined herein specifically to provide a retrofocus wide angle lens system that can be manufactured in a relatively economical manner.

The derivation of the formulae and their relation set forth herein have been accomplished with the assistance of a computer. The present invention represents the parameters of a compromised balance of acceptable aberrations in a relatively easily manufactured and low cost lens system for utilization, for example, with a camera.

For a reference of the techniques of computer design, which are not necessary for either an understanding or the practice of the present invention, the reader is directed to "LENS ABERRATION DATA" by J. M. Palmer, American Elsevier Publishing Company Inc. 1971 and "OPTIMIZATION TECHNIQUES IN LENS DESIGN" by T. H. Jameison, American Elsevier Publishing Company Inc. 1971. These references are incorporated herein simply as supplementing and providing background to the present disclosure.

When referring herein to a lens by the symbol, L, it is to be understood, both in the specification and the claims that the symbol is intended to be interpreted broadly enough to cover either a single lens element or an equivalent comprising a group of two or more lens elements such as a doublet.

As can be seen in each of the embodiments of the present invention disclosed in FIGS. 1, 3, 5 and 7, the retrofocus type wide angle lens system generally comprises three separate lens groups. The first lens group (A) in each of the embodiments of the invention comprises consecutively from the object to the image side of the lens system, a positive meniscus lens, $L_1$, having a convex surface towards the object side; a first negative meniscus lens, $L_2$, having a convex surface towards the object side; a second negative meniscus lens, $L_3$, having a convex surface towards the object side and a positive lens, $L_4$, having a front or object surface with a radius of curvature ($r_7$) whose absolute value is greater than that of the rear or image surface having a radius of curvature ($r_8$).

The second lens group (B) can comprise a negative meniscus lens, $L_5$, having a convex surface on the object side and a positive lens, $L_6$, having at least one biconvex lens. A third lens group (C) can comprise a negative lens, $L_7$, having a front or object surface with a radius of curvature, ($r_{13}$), with an absolute value which is greater than that of the image or rear surface, $r_{14}$; a first positive lens, $L_8$, and a second positive lens, $L_9$. At least one of the three designated lenses of the third lens group (C) being composed of a pair of lens elements cemented together to form a doublet. For example, with respect to the embodiment of the invention disclosed in FIG. 7, the negative lens, $L_7$, is actually a doublet consisting of two cemented lenses. In the embodiment of FIG. 5 a first positive lens, $L_8$, is a cemented doublet while in the embodiment of FIG. 1 the second positive lens, $L_9$, is a doublet of two cemented lenses which is utilized to provide an effective correction of the aberrations. The following design parameters must be maintained to realize the advantages of the present invention;

$$0 > \frac{r_8 + r_7}{r_8 - r_7} > -1.9 \quad ; \qquad (a)$$

$$-0.05 < \frac{r_{14}}{r_{13}} < 0.6 \quad ; \qquad (b)$$

and $$\frac{0.1}{f} < \frac{N_I - N_{II}}{R} < \frac{0.3}{f} \quad . \qquad (c)$$

In the above equations, $r$, refers to the radii of curvature with the sub members representing lens surfaces consecutively from the object side to the image side of the lens system; $N_I$ represents the refractive index of the object or front lens of the cemented doublet of the third lens group; $N_{II}$ represents the refractive index of the rear or image lens of the cemented doublet of the third lens group; R represents the radius of curvature of the common or intermediate surface of the doublet lenses; and $f$ represents the overall focal length of the lens system.

As mentioned previously, a long back focal length, S, is required in the lens system and accordingly the first lens group (A) provides a considerable degree of overall negative refractive power to obtain a long back focal length. The long back focus provides a relatively large free axial spacing between the last surface of the lens system and the image plane, thus accommodating the lens system of the present invention to a pivoted mirror reflex camera. As a result of this negative refractive power required for the long back focus, aberration such as negative distortion, coma and astigmatism result. In accordance with the present invention, these aberrations however are diminished or decreased by forming the first lens group, (A), with a pair of negative lenses $L_2$ and $L_3$, positioned between respective positive lenses, $L_1$ and $L_4$.

The optical effect of the first lens, $L_1$, is to shift the apparent position of the entrance pupil forward to the object side and thus prevent the first lens group, (A), from being bulky. The image surface of the first lens, $L_1$, or rear surface, $r_2$, is utilized for correcting or compensating for negative distortion.

The shape of the fourth lens, $L_4$, of the first lens group (A) is determined by the above equation (a). If the upper limit or value of equation (a) is not maintained, then the absolute value of the radius of curvature of the front surface, $r_7$, will be smaller than that of the rear surface, $r_8$, and the astigmatism in the system is increased rather than compensated or corrected. If the lens design fits within the parameters of equation (a) then both the astigmatism and the distortion can be advantageously compensated. If the lower most limit of the range designated by equation (a) is not maintained, then negative coma will occur in both the zonal ray and the marginal ray and, while correction of distortion will still be possible, the correction of the negative coma in the succeeding lens groups will become difficult.

The fifth lens, $L_5$, in group (B) is utilized for lengthening the back focal length of the system and for obtaining a lens system of a wide field angle. The fifth lens, $L_5$, also increases the occurrence of spherical aberration. To compensate for the spherical aberration, the object side or front surface, $r_{11}$, of the sixth lens, $L_6$, is utilized. However, by correcting the spherical aberration with the sixth lens, coma is then introduced into the lens system. The coma can be corrected in accordance with equation (b) in the design of the seventh lens, $L_7$. This is accomplished either by providing a negative weak refractive power or a positive power to the front surface, $r_{13}$, of the seventh lens which is adjacent the diaphragm. The rear surface, $r_{14}$, is utilized to compensate for the coma.

If it is only necessary to correct coma, this could be accomplished in the seventh lens by providing the surface, $r_{13}$, with a strong negative refractive power. If the seventh lens, $L_7$, was however given a strong negative refractive power the Petzval sum would become small and astigmatism would increase which would require corrective steps to be effectuated in the other lens elements. By maintaining the shape of the seventh lens $L_7$, within the parameters of equation (b), the coma can be appropriately compensated for with a minimum of problems. If the lower range of equation (b) is violated, then the coma which is generated by the front surface, $r_{11}$, of $L_6$, cannot be compensated for and it also becomes difficult to correct distortion. If the upper most limit is exceeded then astigmatism will be increased and the coma will also become unbalanced. In addition, the lens system will tend to introduce excessive aberration and flare will occur, both of these factors are not favorable for providing a desired large aperture ratio for the lens system.

Equation (c) determines the refractive power of the intermediate or common surface of the lenses forming a cemented doublet in the third group (C) and further provides a desirable condition for the final compensation of the coma in the lens system. By adhering to the conditions of equation (c), the occurrence of coma, especially in the zonal ray will be prevented. If the lower most range limit is not maintained, the coma flare in the zonal ray will not be corrected and it will not be possible to obtain a clear image across the entire field angle. If the upper most limit or parameter is not maintained, then coma will become over corrected which is likewise not desirable.

The advantages of the design criteria of the present invention exist not only in the overall individual lens parameters, but more particularly, in the design of the fourth positive lens, $L_4$, and the construction of the third lens group (C). The parameters of the present invention are adequately set forth in the conditions of equations (a), (b) and (c) above. The validity of these formulae are established by the following numerical examples, which have been purposely selected to disclose operative embodiments across the full spectrum of the range limitations set forth herein. Since the specific lens parameters are provided herein to meet the requirements of a full disclosure adequate to convey the present invention to a lens designer, they should not be construed as limiting to any specific lens design set forth in any individual embodiment.

In the accompanying drawings which supplement the following tables, the lenses in accordance with the present invention, are illustrated diagrammatically using reference characters which have been referred to above. As usual, in conventional lens diagrams, the light is assumed to travel from left to right, the individual lenses are designated by the letter, L, with a subscript indicating the number of the lens as numbered consecutively from object to image side. The diaphragms in the figures are indicated by the letter, D. The radii of curvature of the lenses are indicated by, r, with a subscript corresponding to the consecutive numbers of the lens element.

In the Tables, the minus signs indicate surfaces concave toward the object side, while the surfaces without a sign are convex toward the object side. The Tables also disclose the axial spacings, d, along the optical axis and include both the axial spacings between the lens elements and thickness of the lens elements. The axial spacings between the lens elements are positioned accordingly relative to the radii in the Tables while the thicknesses are designated accordingly between the radii. Zero axial spacing indicates lens elements cemented to each other. All other axial spacings greater than zero refer to air spacings.

All linear dimensions are given in absolute values and are given with reference to the equivalent focal length of unity. The Tables also provide with respect to each example, the intended relative aperture, the total angle of view, $2\omega$, and the back focus or back focal length, S, with reference to an object at infinity.

Referring to FIG. 1, the lens parameters of this embodiment are set forth in the following Table 1 wherein $f=1.00$, F/2.8, field of angle $(2\omega)=92°$, and back focal length $(S')=1.75$. The following Table 2 represents the Seidel aberration coefficients of the lens system disclosed in Table 1. FIGS. 2A, 2B, 2C and 2D disclose respectively plots of the spherical aberration, astigmatism, distortion and coma.

Table 1

| | Radius of Curvature | Length on Axis | Refractive Index/ Abbe's No. |
|---|---|---|---|
| | \multicolumn{3}{c}{$f = 1$ F/2.8 field angle $2\omega = 92°$ back focal length $s' = 1.75$} |
| A | $L_1$ $r_1 = 2.9788$ | $d_1 = 0.1850$ | $N_1/V_1 = 1.6968/55.5$ |
| | $r_2 = 9.1510$ | $d_2 = 0.0039$ | |
| | $L_2$ $r_3 = 1.6948$ | $d_3 = 0.0818$ | $N_2/V_2 = 1.6180/63.4$ |
| | $r_4 = 0.5521$ | $d_4 = 0.2531$ | |
| | $L_3$ $r_5 = 1.8573$ | $d_5 = 0.0600$ | $N_3/V_3 = 1.6180/63.4$ |
| | $r_6 = 0.6791$ | $d_6 = 0.1400$ | |
| | $L_4$ $r_7 = 18.8399$ | $d_7 = 0.3053$ | $N_4/V_4 = 1.7557/27.2$ |
| | $r_8 = -4.6715$ | $d_8 = 0.0050$ | |
| B | $L_5$ $r_9 = 1.0595$ | $d_9 = 0.0633$ | $N_5/V_5 = 1.7850/49.9$ |
| | $r_{10} = 0.6401$ | $d_{10} = 0.1039$ | |
| | $L_6$ $r_{11} = 0.8793$ | $d_{11} = 0.3134$ | $N_6/V_6 = 1.7003/47.7$ |
| | $r_{11}' = -3.0738$ | $d_{11} = 0.1143$ | $N_6'/V_6' = 1.5725/57.5$ |
| | $r_{12} = -2.2163$ | $d_{12} = 0.1552$ | |

Table 1-continued f = 1  F/2.8  field angle 2ω = 92°  back focal length s' = 1.75

| Radius of Curvature | | Length on Axis | Refractive Index/ Abbe's No. |
|---|---|---|---|
| C | L₇ $r_{13} = 30.7729$ | | |
| | $r_{14} = 1.2956$ | $d_{13} = 0.0678$ | $N_7/V_7 = 1.80518/25.4$ |
| | | $d_{14} = 0.0569$ | |
| | L₈ $r_{15} = 32.9072$ | $d_{15} = 0.1171$ | $N_8/V_8 = 1.6180/63.4$ |
| | $r_{16} = -0.9373$ | | |
| | | d = 0.0039 | |
| | $r_{17} = -6.8533$ | $d_{17} = 0.0500$ (N$_I$) | $N_9/V_9 = 1.7650/46.3$ |
| | $R_{17}' = 1.0961$ | | |
| | L₉ | $d_{17}' = 0.2027$ (N$_{II}$) | $N_9'/V_9' = 1.60311/60.7$ |
| | $r_{18} = -1.0057$ | | |
| | | Σ d = 2.2826 | |

Table 2

| | spherical aberation | coma | astig- matism | Petzval sum | |
|---|---|---|---|---|---|
| $r_1$ | 0.0092 | 0.0201 | 0.0442 | 0.1379 | 0.4003 |
| $r_2$ | 0.0002 | -0.0043 | 0.0862 | -0.0449 | -0.8245 |
| $r_3$ | 0.0062 | 0.0112 | 0.0203 | 0.2254 | 0.4447 |
| $r_4$ | 3.6048 | 0.5182 | -0.0745 | -0.6918 | 0.1101 |
| $r_5$ | 0.6605 | 0.2973 | 0.1338 | 0.2057 | 0.1528 |
| $r_6$ | 9.4245 | 0.0449 | -0.0002 | -0.5625 | 0.0027 |
| $r_7$ | 1.5884 | 0.6463 | 0.2630 | 0.0229 | 0.1163 |
| $r_8$ | -0.2601 | -0.2717 | -0.2839 | 0.0921 | -0.2004 |
| $r_9$ | 7.1617 | 1.2053 | 0.2028 | 0.4151 | 0.1040 |
| $r_{10}$ | -35.7912 | -2.1978 | -0.6870 | -0.0505 | |
| $r_{11}$ | 28.3813 | 3.0472 | 0.3272 | 0.4684 | 0.0854 |
| $r_{11}'$ | 0.0066 | -0.0064 | 0.0062 | 0.0156 | -0.0210 |
| $r_{12}$ | 0.4665 | -0.2762 | 0.1635 | 0.1643 | -0.1941 |
| $r_{13}$ | -0.0046 | 0.0183 | -0.0732 | 0.0145 | 0.2356 |
| $r_{14}$ | -5.9697 | -2.2975 | -0.8842 | -0.3443 | -0.4728 |
| $r_{15}$ | 0.5816 | 0.4763 | 0.3901 | 0.0116 | 0.3289 |
| $r_{16}$ | 6.2263 | -0.7280 | 0.0851 | 0.4075 | -0.0576 |
| $r_{17}$ | -0.2560 | 0.1873 | -0.1371 | -0.0632 | 0.1466 |
| $r_{17}'$ | -1.0076 | -0.3694 | -0.1354 | -0.0522 | -0.0688 |
| $r_{18}$ | 13.3491 | -0.2939 | 0.0065 | 0.3741 | -0.0084 |
| Σ | 2.1190 | 0.0270 | 0.0054 | 0.1090 | 0.2293 |

The following Table 3 is for a lens design similar in configuration to the lens system shown in FIG. 1 but modified from the embodiment of Table 1 for disclosing a lens design adjacent the lower limit of the condition set forth in equation (a) wherein;

$$\frac{r_8 + r_7}{r_8 - r_7} = -1.89 \tag{1}$$

Table 4 discloses the Seidel coefficients of aberrations for Table 3 and FIG. 10A, 10B, 10C and 10D disclose respectively the spherical aberrations, astigmatism, distortion and coma for the embodiment of Table 3.

Table 3 f = 1  F/2.8  field angle 2ω = 92°  back focal length s' = 1.75

| Radius of curvature | | Length on Axis | Refractive Index/ Abbe's No. |
|---|---|---|---|
| A | L₁ $r_1 = 3.0160$ | $d_1 = 0.1850$ | $N_1/V_1 = 1.6968/55.90$ |
| | $r_2 = 8.8600$ | | |
| | | $d_2 = 0.0039$ | |
| | L₂ $r_3 = 1.6892$ | $d_3 = 0.0818$ | $N_2/V_2 = 1.6180/62.96$ |
| | $r_4 = 0.5519$ | | |
| | | $d_4 = 0.2532$ | |
| | L₃ $r_5 = 1.7801$ | $d_5 = 0.060$ | $N_3/V_3 = 1.6180/62.96$ |
| | $r_6 = 0.6846$ | | |
| | | $d_6 = 0.1424$ | |
| | L₄ $r_7 = -10.5201$ | $d_7 = 0.2995$ | $N_4/V_4 = 1.7557/27.00$ |
| | $r_8 = -3.2402$ | | |
| | | $d_8 = 0.0050$ | |
| B | L₅ $r_9 = 1.0121$ | $d_9 = 0.0633$ | $N_5/V_5 = 1.7850/50.38$ |
| | $r_{10} = 0.6218$ | | |
| | | $d_{10} = 0.1039$ | |
| | $r_{11} = 0.8567$ | $d_{11} = 0.3144$ | $N_6/V_6 = 1.7003/47.75$ |
| | $r_{11}' = 3.0469$ | | |
| | L₆ | $d_{11}' = 0.1143$ | $N_6'/V_6' = 1.5725/57.50$ |
| | $r_{12} = -2.2077$ | | |
| | | $d_{12} = 0.1552$ | |

Table 3-continued f = 1 F/2.8 field angle 2ω = 92° back focal length s' = 1.75

| | Radius of curvature | Length on Axis | Refractive Index/Abbe's No. |
|---|---|---|---|
| C | $r_{13}$ = 19.6632 | | |
| | L₇ | $d_{13}$ = 0.0678 | $N_7/V_7$ = 1.80518/25.23 |
| | $r_{14}$ = 1.2951 | | |
| | | $d_{14}$ = 0.0569 | |
| | $r_{15}$ = 38.5074 | | |
| | L₈ | $d_{15}$ = 0.1261 | $N_8/V_8$ = 1.6180/62.96 |
| | $r_{16}$ = 0.9497 | | |
| | | $d_{16}$ = 0.0039 | |
| | $r_{17}$ = −6.8960 | | |
| | | $d_{17}$ = 0.0050 ($N_I$) | $N_9/V_9$ = 1.7650/46.57 |
| | $R_{17}'$ = 0.9558 | | |
| | L₉ | $d_{17}'$ = 0.2027 ($N_{II}$) | $N_9'/V_9'$ = 1.60311/60.86 |
| | $r_{18}$ = −1.0057 | | |
| | Σ d = 2.2892 | | |

Table 4

| | spherical aberration | coma | astigmatism | Petzval sum | distortion |
|---|---|---|---|---|---|
| $r_1$ | 0.0088 | 0.0196 | 0.0436 | 0.1361 | 0.3998 |
| $r_2$ | 0.0001 | −0.0033 | 0.0805 | −0.0463 | −0.8150 |
| $r_3$ | 0.0070 | 0.0124 | 0.0217 | 0.2261 | 0.4349 |
| $r_4$ | −3.6458 | 0.5711 | −0.0894 | −0.6920 | 0.1224 |
| $r_5$ | 0.7127 | 0.2957 | 0.1226 | 0.2145 | 0.1399 |
| $r_6$ | −9.1278 | 0.1247 | −0.0017 | −0.5579 | 0.0076 |
| $r_7$ | 1.0322 | 0.5374 | 0.2798 | −0.0409 | 0.1243 |
| $r_8$ | −0.1522 | −0.2049 | −0.2761 | 0.1328 | −0.1929 |
| $r_9$ | 8.1481 | 1.1281 | 0.1561 | 0.4345 | 0.0817 |
| $r_{10}$ | −39.3891 | −1.5772 | −0.0631 | −0.7073 | −0.0308 |
| $r_{11}$ | 31.0062 | 2.6459 | 0.2257 | 0.4807 | 0.0603 |
| $r_{11}'$ | 0.0092 | −0.0084 | 0.0076 | 0.0156 | −0.0213 |
| $r_{12}$ | 0.5487 | −0.3176 | 0.1839 | 0.1649 | −0.2019 |
| $r_{13}$ | −0.0052 | 0.0207 | −0.0822 | 0.0226 | 0.2357 |
| $r_{14}$ | −5.4682 | −2.0424 | −0.7628 | −0.3444 | −0.4135 |
| $r_{15}$ | 0.4647 | 0.3979 | 0.3407 | 0.0099 | 0.3003 |
| $r_{16}$ | 6.4764 | −0.8463 | 0.1106 | 0.4021 | −0.0670 |
| $r_{17}$ | −0.3046 | 0.2140 | −0.1504 | −0.0628 | 0.1498 |
| $r_{17}'$ | −1.5137 | −0.4880 | −0.1573 | −0.0598 | −0.0700 |
| $r_{18}$ | 13.3880 | −0.5029 | 0.0188 | 0.3740 | −0.0147 |

Table 4-continued

| | spherical aberration | coma | astigmatism | Petzval sum | distortion |
|---|---|---|---|---|---|
| Σ | 2.1956 | −0.0235 | 0.0089 | 0.1027 | 0.2296 |

Tables 5 and 6 below are also modifications of the basic lens components disclosed in FIG. 1 and are also modified from the lens parameters of Table 1 for disclosing an operative lens system within the upper limit of the range of equation (b) wherein:

$$\frac{r_{14}}{r_{13}} = 0.59 \tag{2}$$

FIGS. 11A, 11B, 11C and 11D show respectively the spherical aberration, astigmatism, distortion and coma for the lens design of Table 5.

Table 5 f = 1 F/2.8 field angle 2ω = 92° back focal length s' = 1.75

| | Radius of curvature | Length on Axis | Refractive Index/Abbe's No. |
|---|---|---|---|
| A | $r_1$ = 2.9883 | | |
| | L₁ | $d_1$ = 0.1850 | $N_1/V_1$ = 1.6968/55.90 |
| | $r_2$ = 9.3516 | | |
| | | $d_2$ = 0.0039 | |
| | $r_3$ = 1.7140 | | |
| | L₂ | $d_3$ = 0.0818 | $N_2/V_2$ = 1.6180/62.96 |
| | $r_4$ = 0.5467 | | |
| | | $d_4$ = 0.2532 | |
| | $r_5$ = 1.8936 | | |
| | L₃ | $d_5$ = 0.0600 | $N_3/V_3$ = 1.6180/62.96 |
| | $r_6$ = 0.6699 | | |
| | | $d_6$ = 0.1400 | |
| | $r_7$ = 23.0909 | | |
| | L₄ | $d_7$ = 0.3051 | $N_4/V_4$ = 1.7557/27.00 |
| | $r_8$ = −5.3541 | | |
| | | $d_8$ = 0.0050 | |
| B | $r_9$ = 1.0760 | | |
| | L₅ | $d_9$ = 0.0633 | $N_5/V_5$ = 1.7850/50.38 |
| | $r_{10}$ = 0.6336 | | |
| | | $d_{10}$ = 0.1039 | |
| | $r_{11}$ = 0.8961 | | |
| | | $d_{11}$ = 0.3138 | $N_6/V_6$ = 1.7003/47.75 |
| | $r_{11}'$ = −2.8234 | | |
| | L₆ | $d_{11}'$ = 0.1143 | $N_6'/V_6'$ = 1.5725/57.50 |
| | $r_{12}$ = −2.3429 | | |
| | | $d_{12}$ = 0.1552 | |
| C | $r_{13}$ = 1.9367 | | |
| | L₇ | $d_{13}$ = 0.0722 | $N_7/V_7$ = 1.92286/20.49 |
| | $r_{14}$ = 1.1427 | | |
| | | $d_{14}$ = 0.0569 | |
| | $r_{15}$ = −7.8761 | | |
| | L₈ | $d_{15}$ = 0.1185 | $N_8/V_8$ = 1.6180/62.96 |
| | $r_{16}$ = −0.8624 | | |
| | | $d_{16}$ = 0.0039 | |
| | $r_{17}$ = −5.8494 | | |
| | | $d_{17}$ = 0.0050 ($N_I$) | $N_9/V_9$ = 1.7650/46.57 |
| | $R_{17}'$ = 0.8038 | | |
| | L₉ | $d_{17}'$ = 0.2535 ($N_{II}$) | $N_9'/V_9'$ = 1.60311/60.86 |
| | $r_{18}$ = 1.1525 | | |
| | Σ d = 2.3395 | | |

Table 6

| | spherical aberration | coma | astigmatism | Petzval sum | distortion |
|---|---|---|---|---|---|
| $r_1$ | 0.0090 | 0.0199 | 0.0440 | 0.1374 | 0.4001 |
| $r_2$ | 0.0002 | −0.0046 | 0.0877 | −0.0439 | −0.8284 |
| $r_3$ | 0.0056 | 0.0104 | 0.0193 | 0.2228 | 0.4482 |
| $r_4$ | −3.7711 | 0.5785 | −0.0887 | −0.6987 | 0.1208 |
| $r_5$ | 0.6774 | 0.2979 | 0.1310 | 0.2017 | 0.1463 |
| $r_6$ | −10.1886 | 0.1834 | −0.0033 | −0.5702 | 0.0103 |
| $r_7$ | 1.7135 | 0.6574 | 0.2522 | 0.0186 | 0.1039 |
| $r_8$ | −0.4141 | −0.3467 | −0.2903 | 0.0803 | −0.1757 |
| $r_9$ | 8.1057 | 1.2014 | 0.1780 | 0.4087 | 0.0869 |
| $r_{10}$ | −42.0706 | −1.8184 | −0.0786 | −0.6941 | −0.0334 |
| $r_{11}$ | 32.7807 | 2.8891 | 0.2546 | 0.4596 | 0.0629 |
| $r_{11}'$ | 0.0044 | −0.0042 | 0.0040 | 0.0169 | −0.0200 |
| $r_{12}$ | 0.2696 | −0.1831 | 0.1243 | 0.1553 | −0.1899 |
| $r_{13}$ | 0.1914 | 0.1454 | 0.1104 | 0.2478 | 0.2721 |
| $r_{14}$ | −4.6897 | −1.7276 | −0.6364 | −0.4200 | −0.3892 |
| $r_{15}$ | 0.0249 | 0.0606 | 0.1470 | −0.0485 | 0.2390 |
| $r_{16}$ | 11.9907 | −1.1127 | 0.1032 | 0.4429 | −0.0506 |
| $r_{17}$ | −0.8960 | 0.4151 | −0.1923 | −0.0741 | 0.1234 |
| $r_{17}'$ | −2.2507 | −0.6489 | −0.1870 | −0.0711 | −0.0744 |
| $r_{18}$ | 10.7386 | −0.5637 | 0.0296 | 0.3264 | −0.0186 |
| Σ | 2.2313 | 0.0491 | 0.0091 | 0.0980 | 0.2336 |

Table 8-continued

| | spherical aberration | coma | astigmatism | Petzval sum | distortion |
|---|---|---|---|---|---|
| $r_2$ | 0.0003 | −0.0053 | 0.0912 | −0.0427 | −0.8373 |
| $r_3$ | 0.0038 | 0.0077 | 0.0157 | 0.2127 | 0.4641 |
| $r_4$ | −3.5819 | 0.5531 | −0.0854 | −0.6849 | 0.1190 |
| $r_5$ | 0.7114 | 0.2948 | 0.1222 | 0.2132 | 0.1390 |
| $r_6$ | −11.5060 | 0.4578 | −0.0182 | −0.6046 | 0.0248 |
| $r_7$ | 1.8938 | 0.6699 | 0.2370 | 0.0225 | 0.0918 |
| $r_8$ | −0.4655 | −0.3656 | −0.2872 | 0.0807 | −0.1621 |
| $r_9$ | 6.9878 | 0.9618 | 0.1324 | 0.3836 | 0.0710 |
| $r_{10}$ | −35.5667 | −0.8112 | −0.0185 | −0.6644 | −0.0156 |
| $r_{11}$ | 29.0861 | 1.9744 | 0.1340 | 0.4521 | 0.0398 |
| $r_{11}'$ | −0.0214 | −0.0516 | −0.1241 | 0.0342 | −0.2165 |
| $r_{12}$ | 0.2714 | 0.2113 | 0.1644 | 0.0742 | 0.1857 |
| $r_{12}$ | 0.3449 | −0.2413 | 0.1688 | 0.1435 | −0.2185 |
| $r_{13}$ | −0.0000 | −0.0014 | −0.0503 | 0.0572 | 0.2466 |
| $r_{14}$ | −6.2154 | −2.0996 | −0.7093 | −0.3704 | −0.3647 |
| $r_{15}$ | 0.4895 | 0.4037 | 0.3330 | 0.0108 | 0.2836 |
| $r_{16}$ | 8.6078 | −0.0691 | 0.1328 | 0.4283 | −0.0697 |
| $r_{17}$ | −0.4293 | 0.2743 | −0.1753 | −0.0624 | 0.1519 |
| $r_{17}'$ | −1.4091 | −0.4512 | −0.1445 | −0.0666 | −0.0676 |
| $r_{18}$ | 12.7582 | −0.7386 | 0.0428 | 0.3620 | −0.0234 |
| Σ | 1.9691 | −0.0058 | 0.0052 | 0.1169 | 0.2387 |

The lens parameters of the embodiment of the invention disclosed in FIG. 3 along with the Seidel coefficients of aberration are set forth respectively in the following Tables 7 and 8 wherein the plots of the spherical aberration, astigmatism, distortion and coma can be found respectively in FIGS. 4A, 4B, 4C and 4D.

A modified lens design having the same general lens configurations as disclosed in FIG. 3 is presented in the following Tables 9 and 10 with the spherical aberration, astigmatism, distortion and coma plotted respectively in FIGS. 13A, 13B, 13C and 13D. The lens system of Table 8 is provided for establishing a lens system example adjacent the lower limit of the range of equation (c) wherein:

$$\frac{N_I - N_{II}}{R} = \frac{0.115}{f} \quad (3)$$

Table 7 f = 1  F/2.8  field angle 2ω = 92°  back focal length s′ = 1.75

| Group | Radius of Curvature | Length of Axis | Refractive Index/Abbe's No. |
|---|---|---|---|
| A | $L_1$ $r_1$ = 2.9788 | $d_1$ = 0.1850 | $N_1/V_1$ = 1.6968/55.8 |
| | $r_2$ = 9.6129 | $d_2$ = 0.0039 | |
| | $L_2$ $r_3$ = 1.7958 | $d_3$ = 0.0818 | $N_2/V_2$ = 1.6180/63.0 |
| | $r_4$ = 0.5577 | $d_4$ = 0.2531 | |
| | $L_3$ $r_5$ = 1.7907 | $d_5$ = 0.0600 | $N_3/V_3$ = 1.61762/52.7 |
| | $r_6$ = 0.6315 | $d_6$ = 0.1404 | |
| | $L_4$ $r_7$ = 19.2253 | $d_7$ = 0.2017 | $N_4/V_4$ = 1.76182/26.3 |
| | $r_8$ = −5.3552 | $d_8$ = 0.0050 | |
| B | $L_5$ $r_9$ = 1.1379 | $d_9$ = 0.0633 | $N_5/V_5$ = 1.7745/50.6 |
| | $r_{10}$ = 0.6569 | $d_{10}$ = 0.1039 | |
| | $L_6$ $r_{11}$ = 0.9120 | $d_{11}$ = 0.2986 | $N_6/V_6$ = 1.70154/41.1 |
| | $r_{11}'$ = −12.0444 | $d_{11}'$ = 0.0200 | |
| | $r_{11}''$ = 4.9086 | $d_{11}''$ = 0.1064 | $N_6'/V_6'$ = 1.5725/57.5 |
| | $r_{12}$ = −2.5370 | $d_{12}$ = 0.1535 | |
| C | $L_7$ $r_{13}$ = 7.7947 | $d_{13}$ = 0.0678 | $N_7/V_7$ = 1.80518/25.2 |
| | $r_{14}$ = 1.2044 | $d_{14}$ = 0.0807 | |
| | $L_8$ $r_{15}$ = 35.2347 | $d_{15}$ = 0.1194 | $N_8/V_8$ = 1.6180/63.0 |
| | $r_{16}$ = −0.8918 | $d_{16}$ = 0.0039 | |
| | $L_9$ $r_{17}$ = −7.1170 | $d_{17}$ = 0.0500 ($N_I$) | $N_9/V_9$ = 1.7995/42.5 |
| | $R_{17}'$ = 1.0228 | $d_{17}'$ = 0.2000 ($N_{II}$) | $N_9'/V_9'$ = 1.60311/60.9 |
| | $r_{18}$ = −1.0394 | Σd = 2.1986 | |

Table 8

| | spherical aberration | coma | astigmatism | Petzval sum | distortion |
|---|---|---|---|---|---|
| $r_1$ | 0.0092 | 0.0200 | 0.0438 | 0.1379 | 0.3970 |

Table 9

| | | f = 1 F/2.8 field angle 2ω = 92° back focal length s' = 1.75 | | |
|---|---|---|---|---|
| | Radius of curvature | | Length on Axis | Refractive Index/Abbe's No. |
| A | $L_1$ | $r_1 = 3.0097$<br>$r_2 = 9.5238$ | $d_1 = 0.1850$<br>$d_2 = 0.0039$ | $N_1/V_1 = 1.6968/55.80$ |
| | $L_2$ | $r_3 = 1.7392$<br>$r_4 = 0.5583$ | $d_3 = 0.0818$<br>$d_4 = 0.2531$ | $N_2/V_2 = 1.6180/62.96$ |
| | $L_3$ | $r_5 = 1.7119$<br>$r_6 = 0.6340$ | $d_5 = 0.0600$<br>$d_6 = 0.1404$ | $N_3/V_3 = 1.61762/52.70$ |
| | $L_4$ | $r_7 = 12.2941$<br>$r_8 = -5.2168$ | $d_7 = 0.2032$<br>$d_8 = 0.0050$ | $N_4/V_4 = 1.76182/26.28$ |
| B | $L_5$ | $r_9 = 1.1673$<br>$r_{10} = 0.6587$ | $d_9 = 0.0633$<br>$d_{10} = 0.1039$ | $N_5/V_5 = 1.7745/50.64$ |
| | $L_6$ | $r_{11} = 0.8990$<br>$r'_{11} = -29.7442$<br>$r''_{11} = 4.6607$<br>$r_{12} = -2.5614$ | $d_{11} = 0.2999$<br>$d'_{11} = 0.0200$<br>$d''_{11} = 0.1064$<br>$d_{12} = 0.1535$ | $N_6/V_6 = 1.70154/41.05$<br><br>$N'_6/V'_6 = 1.5725/57.50$ |
| C | $L_7$ | $r_{13} = 7.1921$<br>$r_{14} = 1.1202$ | $d_{13} = 0.0678$<br>$d_{14} = 0.0807$ | $N_7/V_7 = 1.80518/25.23$ |
| | $L_8$ | $r_{15} = 92.2509$<br>$r_{16} = -0.8883$ | $d_{15} = 0.1231$<br>$d_{16} = 0.0039$ | $N_8/V_8 = 1.6180/62.96$ |
| | $L_9$ | $r_{17} = -4.7371$<br>$R_{17}' = 1.7013$<br>$r_{18} = -0.9916$ | $d_{17} = 0.0050 (N')$<br>$d_{17}' = 0.2000 (N_{II})$<br>Σ d = 2.2050 | $N_9/V_9 = 1.7995/42.47$<br>$N_9'/V_9' = 1.60311/60.86$ |

Table 10

| | spherical aberration | coma | astigmatism | Petzval sum | distortion |
|---|---|---|---|---|---|
| $r_1$ | 0.0088 | 0.0198 | 0.0443 | 0.1364 | 0.4042 |
| $r_2$ | 0.0002 | −0.0047 | 0.0880 | −0.0431 | −0.8271 |
| $r_3$ | 0.0051 | 0.0098 | 0.0188 | 0.2196 | 0.4552 |
| $r_4$ | −3.5162 | 0.4685 | −0.0624 | −0.6841 | 0.0994 |
| $r_5$ | 0.7321 | 0.3103 | 0.1315 | 0.2230 | 0.1502 |
| $r_6$ | −10.8999 | 0.1583 | −0.0023 | −0.6021 | 0.0087 |
| $r_7$ | 1.8614 | 0.7009 | 0.2639 | 0.0351 | 0.1126 |
| $r_8$ | −0.3510 | −0.3222 | −0.2957 | 0.0828 | −0.1953 |
| $r_9$ | 5.9179 | 1.0603 | 0.1900 | 0.3739 | 0.1010 |
| $r_{10}$ | −32.8120 | −1.6862 | −0.0866 | −0.6626 | −0.0385 |
| $r_{11}$ | 27.2224 | 2.6338 | 0.2548 | 0.4586 | 0.0690 |
| $r_{11}'$ | −0.0431 | −0.0782 | −0.1420 | 0.0138 | −0.2325 |
| $r_{11}''$ | 0.2830 | 0.2268 | 0.1819 | 0.0781 | 0.2084 |
| $r_{12}$ | 0.3081 | −0.2177 | 0.1538 | 0.1421 | −0.2091 |
| $r_{13}$ | −0.0001 | −0.0028 | −0.0460 | 0.0620 | 0.2540 |
| $r_{14}$ | −7.3989 | −2.6265 | −0.9324 | −0.3981 | −0.4723 |
| $r_{15}$ | 0.5500 | 0.4620 | 0.3880 | 0.0041 | 0.3294 |
| $r_{16}$ | 7.3310 | −0.7600 | 0.0787 | 0.4299 | −0.0527 |
| $r_{17}$ | −0.4348 | 0.2522 | −0.1463 | −0.0937 | 0.1392 |
| $r_{17}'$ | −0.3385 | −0.1635 | −0.0790 | −0.0400 | −0.0575 |
| $r_{18}$ | 13.6698 | −0.2775 | 0.0056 | 0.3794 | −0.0078 |
| Σ | 2.0955 | 0.1634 | 0.0068 | 0.1153 | 0.2387 |

Another embodiment of the present invention is disclosed in FIG. 5 wherein the positive lens group, $L_6$, comprises a pair of biconvex lenses. A first positive lens $L_8$, in the third lens group (C) includes a cemented doublet. The lens parameters for the embodiment of FIG. 5 is disclosed respectively in Tables 11 and 12 below and FIGS. 6A, 6B, 6C and 6D disclose respectively the spherical aberration, astigmatism, distortion and coma.

Table 11

| | | f = 1 F/2.8 field angle 2ω = 92° back focal length s' = 1.75 | | |
|---|---|---|---|---|
| | Radius of curvature | | Length on Axis | Refractive Index/Abbe's No. |
| A | $L_1$ | $r_1 = 2.9788$<br>$r_2 = 9.6126$ | $d_1 = 0.1850$<br>$d_2 = 0.0039$ | $N_1/V_1 = 1.6968/55.8$ |
| | $L_2$ | $r_3 = 1.7523$<br>$r_4 = 0.5683$ | $d_3 = 0.0818$<br>$d_4 = 0.2531$ | $N_2/V_2 = 1.6180/63.0$ |
| | $L_3$ | $r_5 = 2.3818$<br>$r_6 = 0.7262$ | $d_5 = 0.0600$<br>$d_6 = 0.1404$ | $N_3/V_3 = 1.63854/55.7$ |
| | $L_4$ | $r_7 = -325.4129$<br>$r_8 = -4.9327$ | $d_7 = 0.2378$<br>$d_8 = 0.0050$ | $N_4/V_4 = 1.76182/26.3$ |

Table 11-continued $f = 1$ F/2.8 field angle $2\omega = 92°$ back focal length $s' = 1.75$

| | Radius of curvature | Length on Axis | Refractive Index/ Abbe's No. |
|---|---|---|---|
| B | $L_5 \begin{cases} r_9 = 0.9649 \\ r_{10} = 0.6444 \end{cases}$ | $d_9 = 0.0633$ $d_{10} = 0.1039$ | $N_5/V_5 = 1.7745/50.6$ |
| | $L_6 \begin{cases} r_{11} = 0.8746 \\ r_{11}' = -41.6475 \\ r_{11}'' = 3.0291 \\ r_{12} = -8.2265 \end{cases}$ | $d_{11} = 0.2905$ $d_{11}' = 0.0200$ $d_{11}'' = 0.0969$ $d_{12} = 0.1324$ | $N_6/V_6 = 1.70154/41.1$ $N_6'/V_6' = 1.56873/63.2$ |
| C | $L_7 \begin{cases} r_{13} = 2.6760 \\ r_{14} = 1.2060 \end{cases}$ | $d_{13} = 0.0662$ $d_{14} = 0.0807$ | $N_7/V_7 = 1.80518/25.2$ |
| | $L_8 \begin{cases} r_{15} = -9.2062 \\ R_{15}' = 0.9022 \\ r_{16} = -1.0544 \end{cases}$ | $d_{15} = 0.0500(N_I)$ $d_{15}' = 0.2000(N_{II})$ $d_{16} = 0.0039$ | $N_8/V_8 = 1.8075/35.4$ $N_8'/V_8' = 1.60311/60.9$ |
| | $L_9 \begin{cases} r_{17} = -5.5427 \\ r_{18} = -0.9747 \end{cases}$ | $d_{17} = 0.1300$ $\Sigma d = 2.2047$ | $N_9/V_9 = 1.6180/63.0$ |

Table 12

| | spherical aberration | coma | astigmatism | Petzval sum | distortion |
|---|---|---|---|---|---|
| $r_1$ | 0.0100 | 0.0208 | 0.0435 | 0.1418 | 0.3870 |
| $r_2$ | 0.0003 | −0.0056 | 0.0942 | −0.0439 | −0.8461 |
| $r_3$ | 0.0049 | 0.0091 | 0.0169 | 0.2241 | 0.4458 |
| $r_4$ | −3.5591 | 0.6190 | −0.1076 | −0.6911 | 0.1389 |
| $r_5$ | 0.4915 | 0.2547 | 0.1320 | 0.1683 | 0.1556 |
| $r_6$ | −9.4960 | 0.3779 | −0.0150 | −0.5518 | 0.0226 |
| $r_7$ | 1.5596 | 0.5915 | 0.2243 | −0.0014 | 0.0846 |
| $r_8$ | −0.4329 | −0.3451 | −0.2752 | 0.0901 | −0.1475 |
| $r_9$ | 9.5715 | 0.7966 | 0.0663 | 0.4651 | 0.0442 |
| $r_{10}$ | −34.2233 | −0.1813 | −0.0010 | −0.6965 | −0.0037 |
| $r_{11}$ | 27.6262 | 1.4221 | 0.0732 | 0.4848 | 0.0287 |
| $r_{11}'$ | −0.0113 | −0.0322 | −0.0912 | 0.0102 | −0.2299 |
| $r_{11}''$ | 0.2928 | 0.2055 | 0.1442 | 0.1231 | 0.1876 |
| $r_{12}$ | 0.0360 | −0.0595 | 0.0984 | 0.0453 | −0.2376 |
| $r_{13}$ | 0.0040 | 0.0065 | 0.0105 | 0.1576 | 0.2722 |
| $r_{14}$ | −3.2910 | −1.2428 | −0.4693 | −0.3803 | −9.3208 |
| $r_{15}$ | 0.0316 | 0.0742 | 0.1743 | −0.0499 | 0.2920 |
| $r_{15}'$ | −5.0355 | −1.1146 | −0.2467 | −0.0804 | −0.0724 |
| $r_{16}$ | 2.3394 | −0.5059 | 0.1094 | 0.3669 | −0.1030 |
| $r_{17}$ | −0.0272 | 0.0382 | −0.0537 | −0.0709 | 0.1751 |
| $r_{18}$ | 15.1864 | −0.9613 | 0.0609 | 0.4030 | −0.0294 |
| $\Sigma$ | 1.0777 | −0.0322 | −0.0117 | 0.1141 | 0.2439 |

Referring to the embodiment of the invention disclosed in FIG. 7, the positive lens group, $L_6$, consists of a biconvex lens and the negative lens, $L_7$, of the third lens group (C) is a cemented doublet. The design parameters of this embodiment are set forth in the following Tables 13 and 14 and plots of the spherical aberration, astigmatism, distortion and coma are set forth respectively in FIGS. 8A, 8B, 8C and 8D.

Table 13

$f = 1$ F/2.8 field angle $2\omega = 92°$ back focal length $s' = 1.75$

| | Radius of curvature | Length on Axis | Refractive Index/ Abbe's No. |
|---|---|---|---|
| A | $L_1 \begin{cases} r_1 = 2.5552 \\ r_2 = 6.8380 \end{cases}$ | $d_1 = 0.1850$ $d_2 = 0.0039$ | $N_1/V_1 = 1.7200/52.5$ |
| | $L_2 \begin{cases} r_3 = 2.0441 \\ r_4 = 0.5834 \end{cases}$ | $d_3 = 0.0976$ $d_4 = 0.2844$ | $N_2/V_2 = 1.6388/60.0$ |
| | $L_3 \begin{cases} r_5 = 1.8802 \\ r_6 = 0.8445 \end{cases}$ | $d_5 = 0.0600$ $d_6 = 0.1088$ | $N_3/V_3 = 1.60311/60.9$ |
| | $L_4 \begin{cases} r_7 = 55.6902 \\ r_8 = -5.8786 \end{cases}$ | $d_7 = 0.2317$ $d_8 = 0.0050$ | $N_4/V_4 = 1.68893/31.0$ |
| B | $L_5 \begin{cases} r_9 = 1.1095 \\ r_{10} \end{cases}$ | $d_9 = 0.0633$ $d_{10} = 0.1137$ | $N_5/V_5 = 1.7495/50.4$ |
| | $L_6 \begin{cases} r_{11} = 0.8306 \\ r_{12} = -2.5099 \end{cases}$ | $d_{11} = 0.3912$ $d_{12} = 0.1465$ | $N_6 V_6 = 1.66998/39.2$ |

Table 13-continued $f = 1$ F/2.8 field angle $2\omega = 92°$ back focal length $s' = 1.75$

| Radius of curvature | Length on Axis | Refractive Index/ Abbe's No. |
|---|---|---|
| C $\begin{cases} L_7 \begin{cases} r_{13} = 6.6187 \\ r_{13}' = -1.0407 \\ r_{14} = 1.5955 \end{cases} \\ L_8 \begin{cases} r_{15} = -5.6633 \\ r_{16} = -0.7285 \end{cases} \\ L_9 \begin{cases} r_{17} = -5.4685 \\ r_{18} = -1.3381 \end{cases} \end{cases}$ | $d_{13} = 0.1692(N_I)$ <br> $d_{13}' = 0.0678(N_{II})$ <br> $d_{14} = 0.0569$ <br> $d_{15} = 0.1250$ <br> $d_{16} = 0.0039$ <br> $d_{17} = 0.0846$ <br> $\Sigma d = 2.1985$ | $N_7V_7 = 1.62004/36.3$ <br> $N_7'/V_7' = 1.80518/25.2$ <br><br> $N_8/V_8 = 1.62135/61.3$ <br><br> $N_9/V_9 = 1.6388/60.0$ |

Table 14

| | spherical aberration | coma | astigmatism | Petzval sum | distortion |
|---|---|---|---|---|---|
| $r_1$ | 0.0146 | 0.0248 | 0.0421 | 0.1638 | 0.3496 |
| $r_2$ | 0.0001 | −0.0033 | 0.0919 | −0.0612 | −0.8587 |
| $r_3$ | −0.0000 | −0.0000 | −0.0000 | 0.1907 | 0.5270 |
| $r_4$ | −3.1839 | 0.5863 | −0.1080 | −0.6681 | 0.1429 |
| $r_5$ | 0.6588 | 0.2680 | 0.1091 | 0.2001 | 0.1258 |
| $r_6$ | −5.2459 | −0.1367 | −0.0036 | −0.4455 | −0.0117 |
| $r_7$ | 0.7870 | 0.4201 | 0.2243 | 0.0073 | 0.1237 |
| $r_8$ | −0.2148 | −0.2308 | −0.2480 | 0.0694 | −0.1919 |
| $r_9$ | 4.6581 | 0.7706 | 0.1275 | 0.3861 | 0.0850 |
| $r_{10}$ | −37.5980 | −0.1040 | −0.0003 | −0.7556 | −0.0021 |
| $r_{11}$ | 28.9493 | 1.7066 | 0.1006 | 0.4830 | 0.0344 |
| $r_{12}$ | 0.1073 | −0.1044 | 0.1015 | 0.1598 | −0.2542 |
| $r_{13}$ | 0.0061 | 0.0151 | 0.0372 | 0.0578 | 0.2346 |
| $r_{13}'$ | −1.1578 | 0.1959 | −0.0332 | −0.0608 | 0.0159 |
| $r_{14}$ | −5.8319 | −2.2526 | −0.8701 | −0.2796 | −0.4440 |
| $r_{15}$ | 0.3853 | 0.3835 | 0.3817 | −0.0677 | 0.3126 |
| $r_{16}$ | 11.0782 | −0.8859 | 0.0708 | 0.5261 | −0.0477 |
| $r_{17}$ | −0.2581 | 0.1798 | −0.1253 | −0.0713 | 0.1369 |
| $r_{18}$ | 8.8708 | −0.9351 | 0.0986 | 0.2913 | −0.0411 |
| $\Sigma$ | 2.0252 | −0.1020 | −0.0030 | 0.1258 | 0.2368 |

The following three embodiments are variations of the design parameters of the lens components disclosed in FIG. 7 to disclose the range limitations of equations (a), (b) and (c).

The upper limit of the range of equation (a) can be seen in the lens system of the following tables 15 and 16, wherein:

$$\frac{r_8 + r_7}{r_8 - r_7} = -0.1 \tag{4}$$

The spherical aberration, astigmatism, distortion and coma for the lens system of Table 15 is seen respectively in FIGS. 9A, 9B, 9C and 9D.

Table 15

$f = 1$ F/2.8 field angle $2\omega = 92°$ back focal length $s' = 1.75$

| Radius of curvature | Length on Axis | Refractive Index/ Abbe's No. |
|---|---|---|
| A $\begin{cases} L_1 \begin{cases} r_1 = 2.5466 \\ r_2 = 7.1111 \end{cases} \\ L_2 \begin{cases} r_3 = 2.0412 \\ r_4 = 0.5863 \end{cases} \\ L_3 \begin{cases} r_5 = 1.9356 \\ r_6 = 0.8368 \end{cases} \\ L_4 \begin{cases} r_7 = 9.3429 \\ r_8 = -7.6425 \end{cases} \end{cases}$ | $d_1 = 0.1850$ <br> $d_2 = 0.0039$ <br> $d_3 = 0.0976$ <br> $d_4 = 0.2844$ <br> $d_5 = 0.0600$ <br> $d_6 = 0.1088$ <br> $d_7 = 0.2311$ <br> $d_8 = 0.0050$ | $N_1/V_1 = 1.7200/57.47$ <br><br> $N_2/V_2 = 1.6388/59.96$ <br><br> $N_3/V_3 = 1.60311/60.86$ <br><br> $N_4/V_4 = 1.68893/31.01$ |
| B $\begin{cases} L_5 \begin{cases} r_9 = 1.1508 \\ r_{10} = 0.5752 \end{cases} \\ L_6 \begin{cases} r_{11} = 0.8428 \\ r_{12} = 2.4971 \end{cases} \end{cases}$ | $d_9 = 0.0633$ <br> $d_{10} = 0.1137$ <br> $d_{11} = 0.0390$ <br> $d_{12} = 0.0146$ | $N_5/V_5 = 1.7495/50.41$ <br><br> $N_6/V_6 = 1.66998/39.20$ |
| C $\begin{cases} L_7 \begin{cases} r_{13} = 7.0175 \\ R_{13}' = -1.0407 \\ r_{14} = 1.6000 \end{cases} \\ L_8 \begin{cases} r_{15} = -6.0765 \\ r_{16} = -0.7255 \end{cases} \\ L_9 \begin{cases} r_{17} = -6.1929 \\ r_{18} = -1.4001 \end{cases} \end{cases}$ | $d_{13} = 0.0169(N_I)$ <br> $d_{13}' = 0.0678(N_{II})$ <br> $d_{14} = 0.0569$ <br> $d_{15} = 0.1397$ <br> $d_{16} = 0.0390$ <br> $d_{17} = 0.0884$ <br> $\Sigma d = 2.2156$ | $N_7/V_7 = 1.62004/36.30$ <br> $N_7'/V_7' = 1.80518/25.23$ <br><br> $N_8/V_8 = 1.62135/61.34$ <br><br> $N_9/V_9 = 1.6388/59.96$ |

Table 16

|  | spherical aberration | coma | astigmatism | Petzval sum | distortion |
|---|---|---|---|---|---|
| $r_1$ | 0.0147 | 0.0248 | 0.0420 | 0.1643 | 0.3486 |
| $r_2$ | 0.0002 | −0.0044 | 0.0983 | −0.0588 | −0.8730 |
| $r_3$ | −0.0002 | −0.0006 | −0.0019 | 0.1909 | 0.5322 |
| $r_4$ | −3.0868 | 0.5546 | −0.0996 | −0.6648 | 0.1373 |
| $r_5$ | 0.6084 | 0.2627 | 0.1134 | 0.1943 | 0.1329 |
| $r_6$ | −5.3177 | −0.1383 | −0.0036 | −0.4495 | −0.0117 |
| $r_7$ | 1.0149 | 0.4610 | 0.2094 | 0.0436 | 0.1149 |
| $r_8$ | −0.2263 | −0.2353 | −0.2447 | 0.0533 | −0.1990 |
| $r_9$ | 4.0552 | 0.7610 | 0.1428 | 0.3722 | 0.0966 |
| $r_{10}$ | −34.9056 | −0.3922 | −0.0044 | −0.7447 | −0.0084 |
| $r_{11}$ | 26.8105 | 1.8473 | 0.1272 | 0.4760 | 0.0415 |
| $r_{12}$ | 0.1038 | −0.1020 | 0.1004 | 0.1606 | −0.2567 |
| $r_{13}$ | 0.0050 | 0.0134 | 0.0356 | 0.0545 | 0.2402 |
| $r_{13}'$ | −1.0976 | 0.1836 | −0.0307 | −0.0608 | 0.0153 |
| $r_{14}$ | −5.6700 | −2.2623 | −0.9026 | −0.2787 | −0.4714 |
| $r_{15}$ | 0.4099 | 0.4032 | 0.3965 | −0.0630 | 0.3280 |
| $r_{16}$ | 11.3276 | −0.7702 | 0.0523 | 0.5282 | −0.0394 |
| $r_{17}$ | −0.2417 | 0.1729 | −0.1237 | −0.0629 | 0.1336 |
| $r_{18}$ | 8.2028 | −0.8322 | 0.0844 | 0.2784 | −0.0368 |
| Σ | 2.0071 | −0.0530 | −0.0087 | 0.1332 | 0.2248 |

The following Tables 17 and 18 disclose a lens system which helps establish the lower limit of the range of equation (b) wherein:

$$\frac{r_{14}}{r_{13}} = -0.048 \tag{5}$$

the plots of spherical aberration, astigmatism, distortion and coma can be seen respectively in FIGS. 12A, 12B, 12C and 12D.

Table 18

|  | spherical aberration | coma | astigmatism | Petzval sum | distortion |
|---|---|---|---|---|---|
| $r_1$ | 0.0145 | 0.0251 | 0.0436 | 0.1635 | 0.3592 |
| $r_2$ | 0.0001 | −0.0038 | 0.0948 | −0.0597 | −0.8587 |
| $r_3$ | 0.0000 | 0.0002 | 0.0006 | 0.1945 | 0.5285 |
| $r_4$ | −3.1125 | 0.4641 | −0.0692 | −0.6671 | 0.1098 |
| $r_5$ | 0.6534 | 0.2882 | 0.1271 | 0.2046 | 0.1463 |
| $r_6$ | −4.8124 | −0.3421 | −0.0243 | −0.4379 | −0.0328 |
| $r_7$ | 0.7222 | 0.4285 | 0.2542 | 0.0104 | 0.1570 |
| $r_8$ | −0.1689 | −0.2086 | −0.2576 | 0.0713 | −0.2300 |
| $r_9$ | 4.1925 | 0.9064 | 0.1960 | 0.3840 | 0.2354 |
| $r_{10}$ | −35.0592 | −1.5865 | −0.0717 | −0.7536 | −0.0373 |
| $r_{11}$ | 26.8178 | 2.7711 | 0.2863 | 0.4829 | 0.0794 |
| $r_{12}$ | 0.2244 | −0.1735 | 0.1342 | 0.1782 | −0.2416 |
| $r_{13}$ | −0.0014 | 0.0070 | −0.0355 | −0.0109 | 0.2336 |
| $r_{13}'$ | −1.0963 | 0.1398 | −0.0178 | −0.0643 | 0.0104 |
| $r_{14}$ | −5.9251 | −2.5840 | −1.1269 | −0.2654 | −0.6072 |
| $r_{15}$ | 0.7366 | 0.6182 | 0.5189 | −0.0366 | 0.4048 |
| $r_{16}$ | 10.0665 | −0.3785 | 0.04142 | 0.5152 | −0.0199 |
| $r_{17}$ | −0.2324 | 0.1574 | −0.1066 | −0.0707 | 0.1201 |
| $r_{18}$ | 9.0391 | −0.4670 | 0.0241 | 0.2980 | −0.0166 |
| Σ | 2.0590 | 0.0621 | −0.0155 | 0.1361 | 0.2305 |

In the final embodiment of the present invention disclosed in Tables 19 and 20, the upper limit of the range of equation (c) is established wherein:

$$\frac{N_I - N_{II}}{R} = \frac{0.29}{f} \tag{6}$$

FIGS. 14A, 14B, 14C and 14D disclose respectively spherical aberration, astigmatism, distortion and coma for the lens system of Table 19.

Table 17

| f = 1  F/2.8  field angle 2ω = 92°  back focal length s' = 1.75 ||||
|---|---|---|---|
|  | Radius of curvature | Length on Axis | Refractive Index/Abbe's No. |
| A | $L_1$ { $r_1 = 2.5589$ | $d_1 = 0.1850$ | $N_1/V_1 = 1.7200/52.47$ |
|  | $r_2 = 7.0118$ | $d_2 = 0.0039$ |  |
|  | $L_2$ { $r_3 = 2.0037$ | $d_3 = 0.0976$ | $N_2/V_2 = 1.6388/59.96$ |
|  | $r_4 = 0.5842$ | $d_4 = 0.2844$ |  |
|  | $L_3$ { $r_5 = 1.8380$ | $d_5 = 0.0600$ | $N_3/V_3 = 1.60311/60.86$ |
|  | $r_6 = 0.8590$ | $d_6 = 0.1881$ |  |
|  | $L_4$ { $r_7 = 39.2124$ | $d_7 = 0.2375$ | $N_4/V_4 = 1.68893/31.01$ |
|  | $r_8 = -5.7157$ | $d_8 = 0.0050$ |  |
| B | $L_5$ { $r_9 = 1.1156$ | $d_9 = 0.0638$ | $N_5/V_5 = 1.7495/50.41$ |
|  | $r_{10} = 0.5684$ | $d_{10} = 0.1134$ |  |
|  | $L_6$ { $r_{11} = 0.8307$ | $d_{11} = 0.3934$ | $N_6/V_6 = 1.66998/39.20$ |
|  | $r_{12} = -2.2510$ | $d_{12} = 0.1465$ |  |
| C | $L_7$ { $r_{13} = -34.9996$ | $d_{13} = 0.1692(N_I)$ | $N_7/V_7 = 1.62004/36.30$ |
|  | $R_{13} = -0.9833$ | $d_{13}' = 0.0678(N_{II})$ | $N_7'/V_7' = 1.80518/25.23$ |
|  | $r_{14} = 1.6800$ | $d_{14} = 0.0569$ |  |
|  | $L_8$ { $r_{15} = -10.4578$ | $d_{15} = 0.1390$ | $N_8/V_8 = 1.62135/61.34$ |
|  | $r_{16} = -0.7438$ | $d_{16} = 0.0039$ |  |
|  | $L_9$ { $r_{17} = -5.5062$ | $d_{17} = 0.1006$ | $N_9/V_9 = 1.63880/59.96$ |
|  | $r_{18} = -1.3080$ | Σd = 2.2365 |  |

Table 19

| f = 1 F/2.8 field angle 2ω = 92° back focal length s' = 1.76 |||
|---|---|---|
| Radius of curvature | Length on Axis | Refractive Index/Abbe's No. |
| $r_1 = 2.5521$ (L₁) | $d_1 = 0.1850$ | $N_1/V_1 = 1.7200/52.47$ |
| $r_2 = 6.8978$ | $d_2 = 0.0039$ | |
| $r_3 = 2.0450$ (L₂) | $d_3 = 0.0976$ | $N_2/V_2 = 1.6388/59.96$ |
| $r_4 = 0.5830$ | $d_4 = 0.2844$ | |
| $r_5 = 1.8932$ (L₃) | $d_5 = 0.0600$ | $N_3/V_3 = 1.60311/60.86$ |
| $r_6 = 0.8414$ | $d_6 = 0.1088$ | |
| $r_7 = 69.3067$ (L₄) | $d_7 = 0.2318$ | $N_4/V_4 = 1.68893/31.01$ |
| $r_8 = -5.9101$ | $d_8 = 0.0050$ | |
| $r_9 = 1.1174$ (L₅) | $d_9 = 0.0633$ | $N_5/V_5 = 1.7495/50.41$ |
| $r_{10} = 0.5685$ | $d_{10} = 0.1137$ | |
| $r_{11} = 0.8083$ (L₆) | $d_{11} = 0.0391$ | $N_6/V_6 = 1.66998/39.20$ |
| $r_{12} = -2.4040$ | $d_{12} = 0.1465$ | |
| $r_{13} = 5.9476$ (L₇) | $d_{13} = 0.1692(N_I)$ | $N_7/V_7 = 1.62004/36.30$ |
| $R_{13}' = -0.6384$ | $d_{13}' = 0.0678(N_{II})$ | $N_7'/V_7' = 1.80518/25.23$ |
| $r_{14} = 1.6605$ | $d_{14} = 0.0569$ | |
| $r_{15} = -6.4209$ (L₈) | $d_{15} = 0.1396$ | $N_8/V_8 = 1.62135/62.34$ |
| $r_{16} = -0.6749$ | $d_{16} = 0.0039$ | |
| $r_{17} = -5.0481$ (L₉) | $d_{17} = 0.1027$ | $N_9/V_9 = 1.63880/59.96$ |
| $r_{18} = -1.4297$ | $\Sigma d = 2.2307$ | |

Groups: A = L₁–L₄, B = L₅–L₆, C = L₇–L₉

Table 20

| | spherical aberration | coma | astigmatism | Petzval sum | distortion |
|---|---|---|---|---|---|
| $r_1$ | 0.0146 | 0.0254 | 0.0443 | 0.1640 | 0.3628 |
| $r_2$ | 0.0001 | −0.0035 | 0.0931 | −0.0606 | −0.8519 |
| $r_3$ | −0.0000 | −0.0002 | −0.0005 | 0.1906 | 0.5373 |
| $r_4$ | −3.1849 | 0.4392 | −0.0605 | −0.6686 | 0.1005 |
| $r_5$ | 0.6516 | 0.2975 | 0.1359 | 0.1987 | 0.1528 |
| $r_6$ | −5.3132 | −0.3765 | −0.0266 | −0.4471 | −0.0335 |
| $r_7$ | 0.7908 | 0.4582 | 0.2655 | 0.0058 | 0.1573 |
| $r_8$ | −0.2248 | −0.2470 | −0.2714 | 0.0690 | −0.2224 |
| $r_9$ | 4.6918 | 0.9902 | 0.2089 | 0.3834 | 0.1250 |
| $r_{10}$ | −37.9901 | −1.8353 | −0.0886 | −0.7536 | −0.0406 |
| $r_{11}$ | 30.5408 | 3.0888 | 0.3124 | 0.4963 | 0.0818 |
| $r_{12}$ | 0.1613 | −0.1347 | 0.1125 | 0.1668 | −0.2334 |
| $r_{13}$ | 0.0034 | 0.0093 | 0.0252 | 0.0643 | 0.2428 |
| $r'_{13}$ | −4.6835 | 0.1738 | −0.0064 | −0.0991 | 0.0039 |
| $r_{14}$ | −6.2781 | −2.7007 | −1.1618 | −0.2686 | −0.6153 |
| $r_{15}$ | 0.5890 | 0.5368 | 0.4892 | −0.0596 | 0.3915 |
| $r_{16}$ | 14.9973 | −0.1584 | 0.0016 | 0.5678 | −0.0060 |
| $r_{17}$ | −0.3957 | 0.2136 | −0.1153 | −0.0772 | 0.1039 |
| $r_{18}$ | 8.1020 | −0.4876 | 0.0293 | 0.2726 | −0.0181 |
| $\Sigma$ | 2.4725 | 0.2890 | −0.0130 | 0.1450 | 0.2383 |

As can be readily appreciated, it is possible to deviate from the above embodiments of the present invention and as will be readily understood by those skilled in the art that, the invention is capable of many modifications and improvements within the scope and spirit thereof. Accordingly, it will be understood that the invention is not to be limited by the specific disclosed embodiments but only by the scope and spirit of the appended claims.

What is claimed is:

1. A retrofocus wide angle lens system comprising from the object to image side of the total lens system: a first lens group consisting consecutively from the object side to the image side of a first positive meniscus lens having its convex surface on the object side, a first negative meniscus lens having its convex surface on the object side, a second negative meniscus lens having its convex surface on the object side and a second positive lens whose radius of curvature on the object side surface has a greater absolute value than its radius of curvature on the image side surface;

a second lens group positioned after the first lens group including a negative meniscus lens having its convex surface on the object side and at least one biconvex lens on the image side of the negative meniscus lens;

a diaphragm positioned rearward of the second lens group; and a third lens group positioned after the diaphragm and consisting consecutively from the object side to the image side of a negative lens whose radius of curvature on the object side surface has a greater absolute value than its radius of curvature on the image side surface, a first positive lens and a second positive lens, at least one of the three lenses of the third lens group being a cemented doublet.

2. A lens system as defined in claim 1 wherein the negative lens of the third group is a negative meniscus lens having a convex surface on the object side.

3. A lens system as defined in claim 1 wherein the negative lens of the third group includes a pair of cemented lenses.

4. A lens system as defined in claim 1 wherein the first positive lens of the third group includes a pair of cemented lenses.

5. A lens system as defined in claim 1 wherein the second positive lens of the third group includes a pair of cemented lenses.

6. A lens system as defined in claim 1 having design parameters within the following ranges;

$$0 > \frac{r_8 + r_7}{r_8 - r_7} > -1.9 \quad (a)$$

$$-0.05 < \frac{r_{14}}{r_{13}} < 0.6 \quad (b)$$

$$\frac{0.1}{f} < \frac{N_I - N_{II}}{R} < \frac{0.3}{f} \quad (c)$$

wherein $r_7$ and $r_8$ represent respectively the radii of curvature of the front and rear surfaces of the second positive lens of the first lens group; $r_{13}$ and $r_{14}$ represent respectively the radii of curvature of the front and rear surfaces of the negative lens of the third lens group; $N_I$ represents a refractive index of an object side lens element in the cemented doublet; $N_{II}$ represents a refractive index of an image side lens element in the cemented doublet; R represents the intermediate radius of curvature of the cemented doublet and $f$ represents the total focal length of the lens system.

7. A lens system as defined in claim 6 wherein the second lens group consists consecutively from the object side to the image side of a negative meniscus lens having its convex surface on the object side and a biconvex lens made of homogeneous glass.

8. A lens system as defined in claim 6 wherein the second lens group consists consecutively from the object side to the image side of a negative meniscus lens having its convex surface on the object side and a biconvex lens made of cemented doublet.

9. A lens system as defined in claim 6 wherein the second lens group consists consecutively from the object side to the image side of a negative meniscus lens having its convex surface on the object side, a first positive lens and a second positive lens, at least one of the first and second positive lenses being biconvex.

10. A retrofocus lens system having a relatively long back focal length and a relatively large angle of view comprising the following design parameters:

$f = 1$  F/2.8  field angle $2\omega = 92°$  back focal length $s' = 1.75$

| | Radius of Curvature | Length on Axis | Refractive Index/ Abbe's No. |
|---|---|---|---|
| A | $L_1$ $r_1 = 2.9788$ / $r_2 = 9.1510$ | $d_1 = 0.1850$ | $N_1/V_1 = 1.6968/55.5$ |
| | | $d_2 = 0.0039$ | |
| | $L_2$ $r_3 = 1.6948$ / $r_4 = 0.5521$ | $d_3 = 0.0818$ | $N_2/V_2 = 1.6180/63.4$ |
| | | $d_4 = 0.2531$ | |
| | $L_3$ $r_5 = 1.8573$ / $r_6 = 0.6791$ | $d_5 = 0.0600$ | $N_3/V_3 = 1.6180/63.4$ |
| | | $d_6 = 0.1400$ | |
| | $L_4$ $r_7 = 18.8399$ / $r_8 = 4.6715$ | $d_7 = 0.3053$ | $N_4/V_4 = 1.7557/27.2$ |
| | | $d_8 = 0.0050$ | |
| B | $L_5$ $r_9 = 1.0595$ / $r_{10} = 0.6401$ | $d_9 = 0.0633$ | $N_5/V_5 = 1.7850/49.9$ |
| | | $d_{10} = 0.1039$ | |
| | $L_6$ $r_{11} = 0.8793$ / $r_{11}' = -3.0738$ / $r_{12} = -2.2163$ | $d_{11} = 0.3134$ | $N_6/V_6 = 1.7003/47.7$ |
| | | $d_{11} = 0.1143$ | $N_6'/V_6' = 1.5725/57.5$ |
| | | $d_{12} = 0.1552$ | |
| C | $L_7$ $r_{13} = 30.7729$ / $r_{14} = 1.2956$ | $d_{13} = 0.0678$ | $N_7/V_7 = 1.80518/25.4$ |
| | | $d_{14} = 0.0569$ | |
| | $L_8$ $r_{15} = 32.9072$ / $r_{16} = -0.9373$ | $d_{15} = 0.1171$ | $N_8/V_8 = 1.6180/63.4$ |
| | | $d_{16} = 0.0039$ | |
| | $L_9$ $r_{17} = -6.8533$ / $R_{17}' = 1.0961$ / $r_{18} = -1.0057$ | $d_{17} = 0.0500(N_I)$ | $N_9/V_9 = 1.7650/46.3$ |
| | | $d_{17}' = 0.2027(N_{II})$ | $N_9'/V_9' = 1.60311/60.7$ |
| | | $\Sigma d = 2.2826.$ | |

11. A retrofocus lens system having a relatively long back focal length and a relatively large angle of view comprising the following design parameters:

12. A retrofocus lens system having a relatively long back focal length and a relatively large angle of view comprising the following design parameters:

| | Radius of curvature | Length on Axis | Refractive Index/ Abbe's No. |
|---|---|---|---|
| | \multicolumn{3}{l}{$f = 1$ F/2.8 field angle $2\omega = 92°$ back focal length $s' = 1.75$} | | |

| | Radius of curvature | Length on Axis | Refractive Index/Abbe's No. |
|---|---|---|---|
| A | $L_1$ { $r_1 = 3.0160$ ; $r_2 = 8.8600$ } | $d_1 = 0.1850$ | $N_1/V_1 = 1.6968/55.90$ |
| | | $d_2 = 0.0039$ | |
| | $L_2$ { $r_3 = 1.6892$ ; $r_4 = 0.5519$ } | $d_3 = 0.0818$ | $N_2/V_2 = 1.6180/62.96$ |
| | | $d_4 = 0.2532$ | |
| | $L_3$ { $r_5 = 1.7801$ ; $r_6 = 0.6846$ } | $d_5 = 0.060$ | $N_3/V_3 = 1.6180/62.96$ |
| | | $d_6 = 0.1424$ | |
| | $L_4$ { $r_7 = -10.5201$ ; $r_8 = -3.2402$ } | $d_7 = 0.2995$ | $N_4/V_4 = 1.7557/27.00$ |
| | | $d_8 = 0.0050$ | |
| B | $L_5$ { $r_9 = 1.0121$ ; $r_{10} = 0.6218$ } | $d_9 = 0.0633$ | $N_5/V_5 = 1.7850/50.38$ |
| | | $d_{10} = 0.1039$ | |
| | $L_6$ { $r_{11} = 0.8567$ ; $r_{11}' = -3.0469$ ; $r_{12} = -2.2077$ } | $d_{11} = 0.3144$ | $N_6/V_6 = 1.7003/47.75$ |
| | | $d_{11}' = 0.1143$ | $N_6'/V_6' = 1.5725/57.50$ |
| | | $d_{12} = 0.1552$ | |
| C | $L_7$ { $r_{13} = 19.6632$ ; $r_{14} = 1.2951$ } | $d_{13} = 0.0678$ | $N_7/V_7 = 1.80518/25.23$ |
| | | $d_{14} = 0.0569$ | |
| | $L_8$ { $r_{15} = 38.5074$ ; $r_{16} = 0.9497$ } | $d_{15} = 0.1261$ | $N_8/V_8 = 1.6180/62.96$ |
| | | $d_{16} = 0.0039$ | |
| | $L_9$ { $r_{17} = -6.8960$ ; $R_{17}' = 0.9558$ ; $r_{18} = -1.0057$ } | $d_{17} = 0.0050(N_I)$ | $N_9/V_9 = 1.7650/46.57$ |
| | | $d_{17}' = 0.2027(N_{II})$ | $N_9'/V_9' = 1.60311/60.86$ |
| | | $\Sigma d = 2.2892.$ | |

| | Radius of curvature | Length on Axis | Refractive Index/Abbe's No. |
|---|---|---|---|
| | \multicolumn{3}{l}{$f = 1$ F/2.8 field angle $2\omega = 92°$ back focal length $s' = 1.75$} | | |
| A | $L_1$ { $r_1 = 2.9883$ ; $r_2 = 9.3516$ } | $d_1 = 0.1850$ | $N_1/V_1 = 1.6968/55.90$ |
| | | $d_2 = 0.0039$ | |
| | $L_2$ { $r_3 = 1.7140$ ; $r_4 = 0.5467$ } | $d_3 = 0.0818$ | $N_2/V_2 = 1.6180/62.96$ |
| | | $d_4 = 0.2532$ | |
| | $L_3$ { $r_5 = 1.8936$ ; $r_6 = 0.6699$ } | $d_5 = 0.0600$ | $N_3/V_3 = 1.6180/62.96$ |
| | | $d_6 = 0.1400$ | |
| | $L_4$ { $r_7 = 23.0909$ ; $r_8 = -5.3541$ } | $d_7 = 0.3051$ | $N_4/V_4 = 1.7557/27.00$ |
| | | $d_8 = 0.0050$ | |
| B | $L_5$ { $r_9 = 1.0760$ ; $r_{10} = 0.6336$ } | $d_9 = 0.0633$ | $N_5/V_5 = 1.7850/50.38$ |
| | | $d_{10} = 0.1039$ | |
| | $L_6$ { $r_{11} = 0.8961$ ; $r_{11}' = -2.8234$ ; $r_{12} = -2.3429$ } | $d_{11} = 0.3138$ | $N_6/V_6 = 1.7003/47.75$ |
| | | $d_{11}' = 0.1143$ | $N_6'/V_6' = 1.5725/57.50$ |
| | | $d_{12} = 0.1552$ | |

-continued

| | | f = 1 F/2.8 field angle 2ω = 92° back focal length s' = 1.75 | | |
|---|---|---|---|---|
| Radius of curvature | | | Length on Axis | Refractive Index/ Abbe's No. |
| C | $L_7$ | $r_{13} = 1.9367$ | $d_{13} = 0.0722$ | $N_7/V_7 = 1.92286/20.49$ |
| | | $r_{14} = 1.1427$ | $d_{14} = 0.0569$ | |
| | $L_8$ | $r_{15} = -7.8761$ | $d_{15} = 0.1185$ | $N_8/V_8 = 1.6180/62.96$ |
| | | $r_{16} = -0.8624$ | $d_{16} = 0.0039$ | |
| | $L_9$ | $r_{17} = -5.8494$ | $d_{17} = 0.0050(N_I)$ | $N_9/V_9 = 1.7650/46.57$ |
| | | $R_{17}' = 0.8038$ | $d_{17}' = 0.2535(N_{II})$ | $N_9'/V_9' = 1.60311/60.86$ |
| | | $r_{18} = -1.1525$ | $\Sigma d = 2.3395$ | |

13. A retrofocus lens system having a relatively long back focal length and a relatively large angle of view comprising the following design parameters:

14. A retrofocus lens system having a relatively long back focal length and a relatively large angle of view comprising the following design parameters:

| | | f = 1 F/2.8 field angle 2ω = 92° back focal length s' = 1.75 | | |
|---|---|---|---|---|
| Radius of Curvature | | | Length on Axis | Refractive Index/ Abbe's No. |
| A | $L_1$ | $r_1 = 2.9788$ | $d_1 = 0.1850$ | $N_1/V_1 = 1.6968/55.8$ |
| | | $r_2 = 9.6129$ | $d_2 = 0.0039$ | |
| | $L_2$ | $r_3 = 1.7958$ | $d_3 = 0.0818$ | $N_2/V_2 = 1.6180/63.0$ |
| | | $r_4 = 0.5577$ | $d_4 = 0.2531$ | |
| | $L_3$ | $r_5 = L_3$ | $d_5 = 0.0600$ | $N_3/V_3 = 1.61762/52.7$ |
| | | $r_6 = 0.6315$ | $d_6 = 0.1404$ | |
| | $L_4$ | $r_7 = 19.2253$ | $d_7 = 0.2017$ | $N_4/V_4 = 1.76182/26.3$ |
| | | $r_8 = -5.3552$ | $d_8 = 0.0050$ | |
| B | $L_5$ | $r_9 = 1.1379$ | $d_9 = 0.0633$ | $N_5/V_5 = 1.7745/50.6$ |
| | | $r_{10} = 0.6569$ | $d_{10} = 0.1039$ | |
| | $L_6$ | $r_{11} = 0.9120$ | $d_{11} = 0.2986$ | $N_6/V_6 = 1.70154/41.1$ |
| | | $r_{11}' = -12.0444$ | $d_{11}' = 0.0200$ | |
| | | $r_{11}'' = 4.9086$ | $d_{11}'' = 0.1064$ | $N_6'/V_6' = 1.5725/57.5$ |
| | | $r_{12} = -2.5370$ | $d_{12} = 0.1535$ | |
| C | $L_7$ | $r_{13} = 7.7947$ | $d_{13} = 0.0678$ | $N_7/V_7 = 1.80518/25.2$ |
| | | $r_{14} = 1.2044$ | $d_{14} = 0.0807$ | |
| | $L_8$ | $r_{15} = 35.2347$ | $d_{15} = 0.1194$ | $N_8/V_8 = 1.6180/63.0$ |
| | | $r_{16} = -0.8918$ | $d_{16} = 0.0039$ | |
| | $L_9$ | $r_{17} = -7.1170$ | $d_{17} = 0.0500(N_I)$ | $N_9/V_9 = 1.7995/42.5$ |
| | | $R_{17}' = 1.0228$ | $d_{17}' = 0.2000(N_{II})$ | $N_9'/V_9' = 1.60311/60.9$ |
| | | $r_{18} = -1.0394$ | $\Sigma d = 2.1986$ | |

| f = 1  F/2.8  field angle 2ω = 92° back focal length s' = 1.75 |||
|---|---|---|
| Radius of curvature | Length on Axis | Refractive Index/ Abbe's No. |
| A  L₁ $r_1 = 3.0097$ | $d_1 = 0.1850$ | $N_1/V_1 = 1.6968/55.80$ |
|  $r_2 = 9.5238$ | $d_2 = 0.0039$ | |
| L₂ $r_3 = 1.7392$ | $d_3 = 0.0818$ | $N_2/V_2 = 1.6180/62.96$ |
|  $r_4 = 0.5583$ | $d_4 = 0.2531$ | |
| L₃ $r_5 = 1.7119$ | $d_5 = 0.0600$ | $N_3/V_3 = 1.61762/52.70$ |
|  $r_6 = 0.6340$ | $d_6 = 0.1404$ | |
| L₄ $r_7 = 12.2941$ | $d_7 = 0.2032$ | $N_4/V_4 = 1.76182/26.28$ |
|  $r_8 = -5.2168$ | $d_8 = 0.0050$ | |
| B L₅ $r_9 = 1.1673$ | $d_9 = 0.0633$ | $N_5/V_5 = 1.7745/50.64$ |
|  $r_{10} = 0.6587$ | $d_{10} = 0.1039$ | |
| L₆ $r_{11} = 0.8990$ | $d_{11} = 0.2999$ | $N_6V_6 = 1.70154/41.05$ |
|  $r_{11}' = -29.7442$ | $d_{11}' = 0.0200$ | |
|  $r_{11}'' = 4.6607$ | $d_{11}'' = 0.1064$ | $N_6'/V_6' = 1.5725/57.50$ |
|  $r_{12} = -2.5614$ | $d_{12} = 0.1535$ | |
| C L₇ $r_{13} = 7.1921$ | $d_{13} = 0.0678$ | $N_7/V_7 = 1.80518/25.23$ |
|  $r_{14} = 1.1202$ | $d_{14} = 0.0807$ | |
| L₈ $r_{15} = 92.2509$ | $d_{15} = 0.1231$ | $N_8/V_8 = 1.6180/62.96$ |
|  $r_{16} = -0.8883$ | $d_{16} = 0.0039$ | |
| L₉ $r_{17} = -4.7371$ | $d_{17} = 0.0050(N_I)$ | $N_9V_9 = 1.7995/42.47$ |
|  $r_{17}' = 1.7013$ | $d_{17}' = 0.2000(N_{II})$ | $N_9'/V_9' = 1.60311/60.86$ |
|  $r_{18} = -0.9916$ | $\Sigma d = 2.2050$ | |

15. A retrofocus lens system having a relatively long back focal length and a relatively angle of view comprising the following design parameters:

| f = 1  F/2.8  field angle 2ω = 92° back focal length s' = 1.75 |||
|---|---|---|
| Radius of curvature | Length on Axis | Refractive Index/ Abbe's No. |
| A L₁ $r_1 = 2.9788$ | $d_1 = 0.1850$ | $N_1/V_1 = 1.6968/55.8$ |
|  $r_2 = 9.6126$ | $d_2 = 0.0039$ | |
| L₂ $r_3 = 1.7523$ | $d_3 = 0.0818$ | $N_2/V_2 = 1.6180/63.0$ |
|  $r_4 = 0.5683$ | $d_4 = 0.2531$ | |
| L₃ $r_5 = 2.3818$ | $d_5 = 0.0600$ | $N_3/V_3 = 1.63854/55.7$ |
|  $r_6 = 0.7262$ | $d_6 = 0.1404$ | |
| L₄ $r_7 = -325.4129$ | $d_7 = 0.2378$ | $N_4/V_4 = 1.76182/26.3$ |
|  $r_8 = -4.9327$ | $d_8 = 0.0050$ | |
| B L₅ $r_9 = 0.9649$ | $d_9 = 0.0633$ | $N_5/V_5 = 1.7745/50.6$ |
|  $r_{10} = 0.6444$ | $d_{10} = 0.1039$ | |
| L₆ $r_{11} = 0.8746$ | $d_{11} = 0.2905$ | $N_6/V_6 = 1.70154/41.1$ |
|  $r_{11}' = -41.6475$ | $d_{11}' = 0.0200$ | |
|  $r_{11}'' = 3.0291$ | $d_{11}'' = 0.0969$ | $N_6'/V_6' = 1.56873/63.2$ |
|  $r_{12} = -8.2265$ | $d_{12} = 0.1324$ | |

| $f = 1$ F/2.8 field angle $2\omega = 92°$ back focal length $s' = 1.75$ ||| 
| --- | --- | --- |
| Radius of curvature | Length on Axis | Refractive Index/ Abbe's No. |
| C ⎡ $L_7$ ⎧ $r_{13} = 2.6760$ | $d_{13} = 0.0662$ | $N_7/V_7 = 1.80518/25.2$ |
|  ⎩ $r_{14} = 1.2060$ | $d_{14} = 0.0807$ |  |
|  $L_8$ ⎧ $r_{15} = -9.2062$ | $d_{15} = 0.0500(N_I)$ | $N_8/V_8 = 1.8075/35.4$ |
|   $R_{15}' = 0.9022$ | $d_{15}' = 0.2000(N_{II})$ | $N_8'/V_8' = 1.60311/60.9$ |
|  ⎩ $r_{16} = -1.0544$ | $d_{16} = 0.0039$ |  |
|  $L_9$ ⎧ $r_{17} = -5.5427$ | $d_{17} = 0.1300$ | $N_9/V_9 = 1.6180/63.0$ |
| ⎣ ⎩ $r_{18} = -0.9747$ | $\Sigma d = 2.2047$. |  |

16. A retrofocus lens system having a relatively long back focal length and a relatively large angle of view comprising the following design parameters:

17. A retrofocus lens system having a relatively long back focal length and a relatively large angle of view comprising the following design parameters:

| $f = 1$ F/2.8 field angle $2\omega = 92°$ back focal length $s' = 1.75$ |||
| --- | --- | --- |
| Radius of curvature | Length on Axis | Refractive Index/ Abbe's No. |
| A ⎡ $L_1$ ⎧ $r_1 = 2.5552$ | $d_1 = 0.1850$ | $N_1/V_1 = 1.7200/52.5$ |
|  ⎩ $r_2 = 6.8380$ | $d_2 = 0.0039$ |  |
|  $L_2$ ⎧ $r_3 = 2.0441$ | $d_3 = 0.0976$ | $N_2/V_2 = 1.6388/60.0$ |
|  ⎩ $r_4 = 0.5834$ | $d_4 = 0.2844$ |  |
|  $L_3$ ⎧ $r_5 = 1.8802$ | $d_5 = 0.0600$ | $N_3/V_3 = 1.60311/60.9$ |
|  ⎩ $r_6 = 0.8445$ | $d_6 = 0.1088$ |  |
|  $L_4$ ⎧ $r_7 = 55.6902$ | $d_7 = 0.2317$ | $N_4/V_4 = 1.68893/31.0$ |
| ⎣ ⎩ $r_8 = -5.8786$ | $d_8 = 0.0050$ |  |
| B ⎡ $L_5$ ⎧ $r_9 = 1.1095$ | $d_9 = 0.0633$ | $N_5/V_5 = 1.7495/50.4$ |
|  ⎩ $r_{10} = 0.5670$ | $d_{10} = 0.1137$ |  |
|  $L_6$ ⎧ $r_{11} = 0.8306$ | $d_{11} = 0.3912$ | $N_6/V_6 = 1.66998/39.2$ |
| ⎣ ⎩ $r_{12} = -2.5099$ | $d_{12} = 0.1465$ |  |
| C ⎡ $L_7$ ⎧ $r_{13} = 6.6187$ | $d_{13} = 0.1692(N_I)$ | $N_7N_7 = 1.62004/36.3$ |
|   $R_{13}' = -1.0407$ | $d_{13}' = 0.0678(N_{II})$ | $N_7'/V_7' = 1.80518/25.2$ |
|  ⎩ $r_{14} = 1.5955$ | $d_{14} = 0.0569$ |  |
|  $L_8$ ⎧ $r_{15} = -5.6633$ | $d_{15} = 0.1250$ | $N_8/V_8 = 1.62135/61.3$ |
|  ⎩ $r_{16} = -0.7285$ | $d_{16} = 0.0039$ |  |
|  $L_9$ ⎧ $r_{17} = -5.4685$ | $d_{17} = 0.0846$ | $N_9/V_9 = 1.6388/60.0$ |
| ⎣ ⎩ $r_{18} = -1.3381$ | $\Sigma d = 2.1985$. |  |

| $f = 1$ F/2.8 field angle $2\omega = 92°$ back focal length $s' = 1.75$ |||
| --- | --- | --- |
| Radius of curvature | Length on Axis | Refractive Index/ Abbe's No. |
| A ⎡ $L_1$ ⎧ $r_1 = 2.5466$ | $d_1 = 0.1850$ | $N_1/V_1 = 1.7200/57.47$ |
|  ⎩ $r_2 = 7.1111$ | $d_2 = 0.0039$ |  |
|  $L_2$ ⎧ $r_3 = 2.0412$ | $d_3 = 2 = N_2/V_2 = 1.6388/59.96$ |  |
|  ⎩ $r_4 = 0.5863$ | $d_4 = 0.2844$ |  |
|  $L_3$ ⎧ $r_5 = 1.9356$ | $d_5 = 0.0600$ | $N_3/V_3 = 1.60311/60.86$ |
|  ⎩ $r_6 = 0.8368$ | $d_6 = 0.1088$ |  |
|  $L_4$ ⎧ $r_7 = 9.3429$ | $d_7 = 0.2311$ | $N_4/V_4 = 1.68893/31.01$ |
| ⎣ ⎩ $r_8 = -7.6425$ |  |  |

-continued

| | f = 1 F/2.8 field angle 2ω = 92° back focal length s' = 1.75 | | |
|---|---|---|---|
| Radius of curvature | | Length on Axis | Refractive Index/ Abbe's No. |
| B | $r_9 = 1.1508$ $L_5$ $r_{10} = 0.5752$ | $d_8 = 0.0050$ $d_9 = 0.0633$ $d_{10} = 0.1137$ | $N_5/V_5 = 1.7495/50.41$ |
| | $r_{11} = 0.8428$ $L_6$ $r_{12} = 2.4971$ | $d_{11} = 0.0390$ $d_{12} = 0.0146$ | $N_6/V_6 = 1.66998/39.20$ |
| C | $r_{13} = 7.0175$ $L_7$ $R_{13}' = -1.0407$ $r_{14} = 1.6000$ | $d_{13} = 0.0169(N_I)$ $d_{13}' = 0.0678(N_{II})$ $d_{14} = 0.0569$ | $N_7/V_7 = 1.62004/36.30$ $N_7'/V_7' = 1.80518/25.23$ |
| | $r_{15} = -6.0765$ $L_8$ $r_{16} = -0.7255$ | $d_{15} = 0.1397$ $d_{16} = 0.0390$ | $N_8/V_8 = 1.62135/61.34$ |
| | $r_{17} = -6.1929$ $L_9$ $r_{18} = -1.4001$ | $d_{17} = 0.0884$ $\Sigma d = 2.2156$. | $N_9/V_9 = 1.6388/59.96$ |

18. A retrofocus lens system having a relatively long back focal length and a relatively large angle of view comprising the following design parameters:

19. A retrofocus lens system having a relatively long back focal length and a relatively large angle of view comprising the following design parameters:

| | f = 1 F/2.8 field angle 2ω = 92° back focal length s' = 1.75 | | |
|---|---|---|---|
| Radius of curvature | | Length on Axis | Refractive Index/ Abbe's No. |
| A | $r_1 = 2.5589$ $L_1$ $r_2 = 7.0118$ | $d_1 = 0.1850$ $d_2 = 0.0039$ | $N_1/V_1 = 1.7200/52.47$ |
| | $r_3 = 2.0037$ $L_2$ $r_4 = 0.5842$ | $d_3 = 0.0976$ $d_4 = 0.2844$ | $N_2/V_2 = 1.6388/59.96$ |
| | $r_5 = 1.8380$ $L_3$ $r_6 = 0.8590$ | $d_5 = 0.0600$ $d_6 = 0.1881$ | $N_3/V_3 = 1.60311/60.86$ |
| | $r_7 = 39.2124$ $L_4$ $r_8 = -5.7157$ | $d_7 = 0.2375$ $d_8 = 0.0050$ | $N_4/V_4 = 1.68893/31.01$ |
| B | $r_9 = 1.1156$ $L_5$ $r_{10} = 0.5684$ | $d_9 = 0.0638$ $d_{10} = 0.1134$ | $N_5/V_5 = 1.7495/50.41$ |
| | $r_{11} = 0.8307$ $L_6$ $r_{12} = -2.2510$ | $d_{11} = 0.3934$ $d_{12} = 0.1465$ | $N_6/V_6 = 1.66998/39.20$ |
| C | $r_{13} = -34.9996$ $L_7$ $R_{13}' = -0.9833$ $r_{14} = 1.6800$ | $d_{13} = 0.1692(N_I)$ $d_{13}' = 0.0678(N_{II})$ $d_{14} = 0.0569$ | $N_7/V_7 = 1.62004/36.30$ $N_7'/V_7' = 1.80518/25.23$ |
| | $r_{15} = -10.4578$ $L_8$ $r_{16} = -0.7438$ | $d_{15} = 0.1390$ $d_{16} = 0.0039$ | $N_8/V_8 = 1.62135/61.34$ |
| | $r_{17} = -5.5062$ $L_9$ $r_{18} = -1.3080$ | $d_{17} = 0.1006$ $\Sigma d = 2.2365$. | $N_9/V_9 = 1.63880/59.96$ |

-continued

| | Radius of curvature | | Length on Axis | Refractive Index/ Abbe's No. |
|---|---|---|---|---|
| | \multicolumn{4}{l|}{$f = 1$  F/2.8  field angle $2\omega = 92°$  back focal length $s' = 1.76$} | |
| A | L$_1$ | $r_1 = 2.5521$ | $d_1 = 0.1850$ | $N_1/V_1 = 1.7200/52.47$ |
| | | $r_2 = 6.8978$ | $d_2 = 0.0039$ | |
| | L$_2$ | $r_3 = 2.0450$ | $d_3 = 0.0976$ | $N_2/V_2 = 1.6388/59.96$ |
| | | $r_4 = 0.5830$ | $d_4 = 0.2844$ | |
| | L$_3$ | $r_5 = 1.8932$ | $d_5 = 0.0600$ | $N_3/V_3 = 1.60311/60.86$ |
| | | $r_6 = 0.8414$ | $d_6 = 0.1088$ | |
| | L$_4$ | $r_7 = 69.3067$ | $d_7 = 0.2318$ | $N_4/V_4 = 1.68893/31.01$ |
| | | $r_8 = -5.9101$ | $d_8 = 0.0050$ | |
| B | L$_5$ | $r_9 = 1.1174$ | $d_9 = 0.0633$ | $N_5/V_5 = 1.7495/50.41$ |
| | | $r_{10} = 0.5685$ | $d_{10} = 0.1137$ | |
| | L$_6$ | $r_{11} = 0.8033$ | $d_{11} = 0.0391$ | $N_6/V_6 = 1.66998/39.20$ |
| | | $r_{12} = -2.4040$ | $d_{12} = 0.1465$ | |
| C | L$_7$ | $r_{13} = 5.9476$ | $d_{13} = 0.1692(N_I)$ | $N_7/V_7 = 1.62004/36.30$ |
| | | $R_{13}' = -0.6384$ | $d_{13}' = 0.0678(N_{II})$ | $N_7'/V_7' = 1.80518/25.23$ |
| | | $r_{14} = 1.6605$ | $d_{14} = 0.0569$ | |
| | L$_8$ | $r_{15} = -6.4209$ | $d_{15} = 0.1396$ | $N_8/V_8 = 1.62135/61.34$ |
| | | $r_{16} = -0.6749$ | $d_{16} = 0.0039$ | |
| | L$_9$ | $r_{17} = -5.0481$ | $d_{17} = 0.1027$ | $N_9/V_9 = 1.63880/59.96$ |
| | | $r_{18} = -1.4297$ | $\Sigma d = 2.2307$ | |

* * * * *

UNITED STATES PATENT AND TRADEMARK OFFICE
CERTIFICATE OF CORRECTION

PATENT NO. : 3,981,563
DATED : September 21, 1976
INVENTOR(S) : Akiyoshi Nakamura It is certified that error appears in the above-identified patent and that said Letters Patent are hereby corrected as shown below:

Col. 4, line 6 delete "members" and insert --numbers--.

Col. 7, Table 2 insert --distortion-- as heading of last column.

Col. 7, Table 2 on line 32 delete "-0.6870  -0.0505" and after -2.1978 insert -- -0.1350 -0.6870  -0.0505--.

Col. 18, Table 15 in Section C, $L_7$, delete "$R_{13}' = -1.0407$" and insert --$R_{13}' = -1.0407$--.

Col. 20, Table 18, line 15 under astigmatism delete "0.04142" and insert --0.0142--.

Col. 21, Table 19 in Section C, $L_8$, delete "$N_8/V_8 = 1.62135/62.34$" and insert --$N_8/V_8 = 1.62135/61.34$--.

Col. 24, Table after Claim 10. In Section C, $L_9$, delete "$r_{18} = -1.0057$" and insert --$r_{18} = -1.0057$--.

Col. 27, Table after Claim 13. In Section A, $L_3$ delete "$r_5 = L_3$" and insert --$r_5 = 1.7907$--.

Col. 32, Table after Claim 17. In Section A, $L_2$ delete "$d_3 = 2 = N_2/V_2 = 1.6388/59.96$" and insert --$d_3 = 0.0976$  $N_2/V_2 = 1.6388/59.96$--.

Col. 35, Section B, $L_6$ delete "$r_{11} = 0.8033$" and insert --$r_{11} = 0.8083$--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*